(12) United States Patent
Lin

(10) Patent No.: US 7,227,185 B2
(45) Date of Patent: Jun. 5, 2007

(54) THIN FILM TRANSISTOR LIQUID CRYSTAL DISPLAY

(75) Inventor: Lih-Nian Lin, Tainan (TW)

(73) Assignee: Chi Mei Optoelectronics Corporation (TW)

( * ) Notice: Subject to any disclaimer, the term of this patent is extended or adjusted under 35 U.S.C. 154(b) by 27 days.

(21) Appl. No.: 10/896,358

(22) Filed: Jul. 21, 2004

(65) Prior Publication Data

US 2005/0078252 A1  Apr. 14, 2005

(30) Foreign Application Priority Data

Jul. 22, 2003  (TW) ............................... 92119940 A

(51) Int. Cl.
  *H01L 29/04* (2006.01)
(52) U.S. Cl. ............................ 257/59; 257/57; 257/72; 257/83; 257/257; 257/290; 257/368
(58) Field of Classification Search ...................... None
  See application file for complete search history.

(56) References Cited

U.S. PATENT DOCUMENTS

| | | |
|---|---|---|
| 5,870,157 A | 2/1999 | Shimada et al. |
| 6,268,895 B1 | 7/2001 | Shimada et al. |
| 2001/0005245 A1 | 6/2001 | Sakamoto et al. |
| 2003/0076464 A1* | 4/2003 | Ozawa et al. ............... 349/113 |
| 2004/0061816 A1* | 4/2004 | Tsuchiya et al. ............ 349/113 |

FOREIGN PATENT DOCUMENTS

| | | |
|---|---|---|
| JP | 2000-155336 | 6/2000 |
| JP | 2001-183648 | 7/2001 |
| JP | 2003-107444 | 4/2003 |

* cited by examiner

*Primary Examiner*—Wai-Sing Louie
(74) *Attorney, Agent, or Firm*—Fish & Richardson P.C.

(57) ABSTRACT

A thin film transistor (TFT) liquid crystal display (LCD) panel, its array substrate, and its manufacturing method. Color filters are integrated on the TFT array, and color filter stacks are formed on the thin film transistors to replace a black matrix, thereby reducing manufacturing time and costs. The color filter stacks can be placed at the border of the display area of the panel to reduce light leakage. The border of the display area has a liquid crystal injection hole. To allow the size of the liquid crystal injection hole to be increased, and to reduce the light leakage at the hole, color filter blocks and overlapping metal layers can be used at the border of the display area. The color filter stacks and other dielectric layers need to be away from the welding points of repair structures to prevent dielectric layer bursts during a repair process. Storage capacitors can use the feature described above so that the color filters are positioned away from the overlapping portions. Welding is used to improve the electrical contact between the metal layers and the pixel electrode.

57 Claims, 15 Drawing Sheets

THIN FILM TRANSISTOR LIQUID CRYSTAL DISPLAY

BACKGROUND

This invention relates to a liquid crystal display panel, and more particularly to a thin film transistor liquid crystal display having color filters integrated with a thin film transistor array (referred to as color filter on array, abbreviated as COA), its array substrate, and its fabrication method.

With the advancement of technology, video products, particularly digital video or image devices, have become common products in everyday lives. In these digital video or image devices, display devices are important components that allow users to obtain information or to further control the operation of the video or image devices.

The sizes of video or image devices have become thinner and lighter. While traditional cathode ray tube (CRT) displays have certain advantages, they take up considerable space and consume more energy. Using optoelectronics and semiconductor manufacturing technologies, flat panel displays, such as thin film transistor (TFT) liquid crystal displays (LCDs), have become popular display products. TFT LCDs have several advantages over traditional CRT displays, such as lower operation voltage, zero radiation, light weight, and smaller volume. TFT LCDs and other flat panel displays, such as plasma displays and electroluminance displays, recently have become a main topic of display researches, and have been viewed as the mainstream display devices of the twenty-first century.

FIG. 1 shows a conventional TFT LCD panel, which typically has a TFT array substrate 102, an opposite substrate 104, and a liquid crystal layer (not shown), which is positioned between the substrates 102 and 104. On the TFT array substrate 102, there is a TFT array 112, which includes scan lines, data lines, and thin film transistors. Between the substrates 102 and 104, there is a frame sealant 106 that is used to seal the space between the substrates 102 and 104 so that the liquid crystal remains within the sealed space. The sealed space is mainly used to display patterns or colors, and thus is referred to as the display area. The frame sealant 106 has a liquid crystal injection hole 108 to facilitate injection of the liquid crystal.

In addition to the conventional TFT LCD panel described above, there is another kind of technique for manufacturing TFT LCD panels, characterized in that color filters (which are thin films) are fabricated directly on the substrate 102 that has the TFT array 112. An advantage of this technique is that the aperture ratio can be increased. The TFT LCD panels that have color filters integrated on the TFT array substrate can be used in products such as thin and lightweight notebooks having high definition displays, LCD televisions, and high-end LCD monitors.

The conventional TFT LCD panel having color filters integrated with the TFT array substrate can have a number of disadvantages.

In the example of FIG. 1, prior to fabricating the color filters directly on the substrate 104 that has the TFT array 112, it is necessary to fabricate the black matrix (BM) first. Many researches have focused on finding ways to reduce the cost and manufacturing time of TFT LCD panels that use the color-filter-on-array technique. When the black matrix and the color filters are fabricated on different substrates, misalignment of the back matrix and the color filters may reduce the product yield rate.

Light emitted by circuitry on the substrate 102 can be leaked from the border 110 (FIG. 1) of the display area, adversely affecting the display quality of the TFT LCD panel. Light can also be leaked from the liquid crystal injection hole 108.

Each TFT in the TFT array 112, or the conducting lines surrounding the TFT array 112, typically has a repair structure (not shown) that can be used to repair defects in the TFT or defects in the signal lines (line defects). In a conventional design, the repair structure is covered by a thick layer of dielectric. Bursts often occur in the dielectric layer during the repair process, preventing the defective TFT or signal line from being repaired.

Each TFT in the TFT array 112 corresponds to a storage capacitor (Cst) that is formed by an insulation layer sandwiched between two metal layers. The upper metal layer is connected to a pixel electrode so that it can be controlled by the TFT. Because of imperfections in the microlithography process, such as imperfections in the development of photoresist or etching process, portions of the dielectric layer may remain between the metal layer and the pixel electrode due to incomplete exposure or incomplete etching, resulting in poor electric contact between the metal layer and the pixel electrode. Such imperfections prevent the storage capacitor from maintaining a specified charge within a specified time to allow the display pixel to show a specified gray level, thus reducing the performance of the display panel.

SUMMARY OF THE INVENTION

An object of the invention is to provide a TFT LCD panel and its fabrication method to reduce the fabrication time.

Another object of the invention is to provide a TFT LCD panel and its fabrication method to reduce the fabrication cost.

Another object of the invention is to provide a TFT LCD panel and its fabrication method to reduce the amount of light that is leaked at the border of the display area.

Another object of the invention is to provide a TFT LCD panel and its fabrication method to reduce the amount of light leaked at the LCD injection hole.

Another object of the invention is to provide a TFT LCD panel and its fabrication method to prevent dielectric layer bursts from occurring at the repair structures during repair processes.

Another object of the invention is to provide a TFT LCD panel and its fabrication method to prevent the problem of poor electric connectivity at the storage capacitor.

This invention provides a TFT array substrate that includes a substrate, scan lines, data lines, TFTs, pixel electrodes, color filters, and color filter stacks. The scan lines and the data lines are disposed on the substrate and define pixel regions. The TFTs are disposed at the intersections of scan lines and data lines, and are controlled by using the scan lines and the data lines. The pixel electrodes are disposed in the pixel regions and connected to corresponding TFTs. The color filters are disposed on the pixel regions, and the color filter stacks are disposed on the color filters.

A TFT LCD panel can be fabricated by adding an opposite substrate and a liquid crystal layer that is sandwiched between the substrates.

According to one aspect of the invention, a TFT pixel structure is provided in which pixel regions are disposed above the substrate. The pixel regions include pixel electrodes, TFTs, signal lines, first color filter stacks, second color filter stacks, and third color filter stacks. The pixel electrodes and the TFTs are disposed in the pixel regions.

Signal lines are disposed at the borders of the pixel regions to define the pixel regions. Pixel electrodes are electrically connected to the signal lines through the TFTs. The first color filter stacks are disposed on the pixel electrodes, the second color filter stacks are disposed on the signal lines, and the third color filter stacks are disposed on the TFTs.

According to another aspect of the invention, a TFT array substrate fabrication method includes forming a first metal layer on a substrate, and patterning the first metal layer to form gate electrodes and scan lines. A gate insulation layer is formed above the substrate, and a patterned amorphous silicon layer is formed above the gate electrode to form channel layers. A second metal layer is formed above the substrate and patterned to form source electrodes and drain electrodes above the gate electrodes, and data lines above the substrate. The data lines and the scan lines define pixel regions. The gate electrodes, the channel layers, the source electrodes, and the drain electrodes form TFTs. First color filters are formed in the pixel regions, and second color filters are formed above the first color filters above the TFTs. Pixel electrodes are formed above the substrate in the pixel regions, and the pixel electrodes are electrically connected to corresponding TFTs.

An opposing substrate can be positioned at a distance from the TFT array substrate. A TFT LCD panel can be fabricated by forming a liquid crystal layer between the TFT array substrate and the opposing substrate.

According to another aspect of the invention, a method of fabricating a TFT array substrate includes forming scan lines on a substrate, and forming data lines on the substrate, wherein the data lines and the scan lines define pixel regions. TFTs are formed at the intersections of the scan lines and the data lines, and are controlled by using the data lines and the scan lines. Pixel electrodes are formed in the pixel regions and electrically connected to corresponding TFTs. Color filters are formed above the pixel regions, and color filter stacks are formed on the color filters above the TFTs.

According to another aspect of the invention, a TFT array substrate includes a display area and a non-display area, characterized in that a ring-shaped color filter stack is disposed in the non-display area and surrounds the display area.

According to another aspect of the invention, a TFT array substrate includes a display area and a non-display area, characterized in that first metal layers are disposed in the non-display area at the border of the display area, and second metal layers partially overlap the first metal layers to prevent light from leaking at the border of the display area.

According to another aspect of the invention, a TFT array substrate includes a display area and a non-display area, characterized in that a first metal layer is disposed at the border of the display area, a second metal layer partially overlaps the first metal layer, and at least a ring-shaped color filter surrounds the display area.

According to another aspect of the invention, a light shielding structure, suitable for use in a non-display area of a TFT array substrate, includes a first metal layer that is disposed at a non-display area, a second metal layer that overlaps the first metal layer, in which the first and second metal layers are electrically insulated by an insulation layer, and at least one color filter is disposed above the first and second metal layers.

According to another aspect of the invention, a method of fabricating a TFT array substrate includes forming a first metal layer above a substrate that includes a display area and a non-display area. A first metal layer is patterned to form gate electrodes and scan lines, in which the scan lines extend to the border of the display area. A gate insulation layer and an amorphous silicon layer are formed above the substrate. Portions of the amorphous layer that are not directly above the gate electrode are removed to form channel layers. A second metal layer is formed above the substrate and patterned to form source electrodes and drain electrodes above the gate electrodes, to form data lines above the substrate, and to form strips of quasi-metal layers at the border of the display area. The data lines and the scan lines define of pixel regions. The gate electrodes, the channel layers, the source electrodes, and the drain electrodes in combination form TFTs, and the quasi-metal layers partially overlap the scan lines. A first color filter is formed above the substrate. The first color filter is patterned to preserve portions of the first color filter that are in the pixel regions and at the border of the display area. A second color filter is formed to overlap the first color filter at the border of the display area. Pixel electrodes are formed in the pixel regions above the substrate, and the pixel electrodes are electrically connected to corresponding TFTs.

According to another aspect of the invention, a method of fabricating a TFT array substrate includes providing a substrate that includes a display area and a non-display area, characterized in that a ring-shaped color filter stack is formed in the non-display area of the substrate, in which the ring-shaped color filter stack surrounds the border of the display area.

According to another aspect of the invention, a method of fabricating a TFT array substrate includes forming a first metal layer above a substrate, the substrate including a display area and a non-display area. The first metal layer is patterned to form gate electrodes and scan lines in the display area, in which the scan lines extend to the border of the display area. A gate insulation layer is formed above the substrate, and an amorphous layer is formed and patterned to form channel layers above the gate electrodes. A second metal layer is formed above the substrate and patterned to form source electrodes and drain electrodes above the gate electrodes, to form data lines above the substrate, and to form strips quasi-metal layers at the border of the display area, in which the data lines and the scan lines define pixel regions. The gate electrodes, the channel layers, the source electrodes, and the drain electrodes form TFTs. The quasi-metal layers partially overlap the scan lines to prevent light from leaking at the border of the display area. Color filters are formed in the pixel regions above the substrate. Pixel electrodes are formed in the display area above the substrate, in which the pixel electrodes are electrically connected to corresponding TFTs.

According to another aspect of the invention, a method of fabricating a TFT array substrate includes forming a first metal layer above a substrate that includes a display area and a non-display area. The first metal layer is patterned to form gate electrodes and scan lines in the display area, and to form strips quasi-metal layers at the border of the display area. A gate insulation layer is formed above the substrate, and a patterned amorphous silicon layer is formed above the gate electrode to form channel layers. A second metal layer is formed above the substrate and patterned to form source electrodes and drain electrodes above the gate electrodes, to form data lines above the substrate, in which the data lines extend to the border of the display area, and the data lines and the scan lines define pixel regions. The gate electrodes, the channel layers, the source electrodes, and the drain electrodes together form TFTs, and the quasi-metal layers partially overlap the data lines to prevent light from leaking at the border of the display area. Color filters are formed in the pixel regions above the substrate. Pixel electrodes are formed in the display area above the substrate, in which the pixel electrodes are electrically connected to corresponding TFTs.

According to another aspect of the invention, a method of fabricating a TFT array substrate includes providing a substrate that includes a display area and a non-display area, characterized in that first metal layers are formed at the borders of the display area, and second metal layers are formed above the substrate, the second metal layers partially overlapping the first metal layers to prevent light from leaking at the border of the display area.

According to another aspect of the invention, a method of fabricating a TFT array substrate includes forming a first metal layer above a substrate that includes a display area and a non-display area. The first metal layer is patterned to form gate electrodes and scan lines in the display area, the scan lines extending to the border of the display area. A gate insulation layer is formed above the substrate. A patterned amorphous silicon layer is formed above the gate electrode to form channel layers. A second metal layer is formed above the substrate and patterned to form source electrodes and drain electrodes above the gate electrodes, to form data lines above the substrate, and to form strips quasi-metal layers at the border of the display area. The data lines and the scan lines define pixel regions. The gate electrodes, the channel layers, the source electrodes, and the drain electrodes together form TFTs, and the quasi-metal layers partly overlap the scan lines to prevent light from leaking at the border of the display area. A first color filter is formed above the substrate. The first color filter is patterned to preserve portions of the first color filter in the pixel region, and to form a ring-shaped color filter at the border of the display area. Pixel electrodes are formed in the display area above the substrate, in which the pixel electrodes are electrically connected to corresponding TFTs.

According to another aspect of the invention, a method of fabricating a TFT array substrate includes forming a first metal layer above a substrate that includes a display area and a non-display area. The first metal layer is patterned to form gate electrodes and scan lines in the display area, and to form strips of quasi-metal layers at the border of the display area. A gate insulation layer is formed above the substrate. A patterned amorphous silicon layer is formed above the gate electrodes to form channel layers. A second metal layer is formed above the substrate and patterned to form source electrodes and drain electrodes above the gate electrodes, to form data lines above the substrate, in which the data lines extend to the border of the display area. The data lines and the scan lines define pixel regions. The gate electrodes, the channel layers, the source electrodes, and the drain electrodes together form TFTs, and the quasi-metal layers partially overlap the data lines to prevent light from leaking at the border of the display area. A first color filter is formed above the substrate. The first color filter is patterned to preserve portions of the first color filter in the pixel region, and to form a ring-shaped color filter at the border of the display area. Pixel electrodes are formed in the display area above the substrate, in which the pixel electrodes are electrically connected to corresponding TFTs.

According to another aspect of the invention, a method of fabricating a TFT array substrate includes providing a substrate that includes a display area and a non-display area, characterized in that first metal layers are formed at the border of the display area, and second metal layers are formed above the substrate, wherein the second metal layers partially overlap the first metal layers. A ring-shaped color filter is formed to surround the border of the display area.

According to another aspect of the invention, a TFT array substrate includes a display area and a non-display area, the non-display area having a liquid crystal injection hole, characterized in that the TFT array substrate has first metal layers that are disposed at the non-display area, and second metal layers that partially overlap the first metal layers. A color filter stack is disposed in the non-display area outside of the liquid crystal injection hole. A first color filter block is positioned above the portion of the non-display area exposed by the liquid crystal injection hole.

According to another aspect of the invention, a TFT array substrate includes a display area and a non-display area, in which the border of the non-display area has a liquid crystal injection hole. First metal layers are disposed at the portion of the substrate exposed by the liquid crystal injection hole. Second metal layers partially overlap the first metal layers to prevent light from leaking at the liquid crystal injection hole.

According to another aspect of the invention, a method of fabricating a TFT array substrate includes forming a first metal layer above a substrate that includes a display area and a non-display area, in which the border of the display area has a liquid crystal injection hole. The first metal layer is patterned to form gate electrodes and scan lines, in which the scan lines extend to the border of the display area. A gate insulation layer and an amorphous silicon layer are formed above the substrate. Portions of the amorphous layer that are not directly above the gate electrodes are removed to form channel layers. A second metal layer is formed above the substrate and patterned to form source electrodes and drain electrodes above the gate electrodes, to form data lines above the substrate, and to form strips of quasi-metal layers. The data lines and the scan lines define pixel regions. The gate electrodes, the channel layers, the source electrodes, and the drain electrodes together form thin film transistors. The quasi-metal layers partially overlap the scan lines. A first color filter is formed above the substrate and patterned to preserve portions of the first color filter that are in the pixel regions and at the portion of the substrate exposed by the liquid crystal injection hole at the border of the display area. Pixel electrodes are formed in the display area above the substrate and electrically connected to corresponding TFTs.

According to another aspect of the invention, a method of fabricating a TFT array substrate includes forming a first metal layer above a substrate that includes a display area and a non-display area, in which the border of the display area has a liquid crystal injection hole. The first metal layer is patterned to form gate electrodes and scan lines in the display area, and to form strips of quasi-metal layers above the substrate that is exposed by the opening of the liquid crystal injection hole at the border of the display area. A gate insulation layer is formed above the substrate. A patterned amorphous layer is formed above the gate electrode to generate channel layers. A second metal layer is formed above the substrate and patterned to form a source electrodes and drain electrodes above the gate electrodes, to form data lines above the substrate that extend to the liquid crystal injection hole at the border of the display area. The data lines and the scan lines define pixel regions. The quasi-metal layers partially overlap the data lines to prevent light from leaking through the opening at the liquid crystal injection hole. The gate electrodes, the channel layers, the source electrodes, and the drain electrodes in combination form thin film transistors. Color filters are formed in the pixel regions.

Pixel electrodes are formed in the pixel regions and electrically connected to corresponding TFTs.

According to another aspect of the invention, a method of fabricating a TFT array substrate includes providing a substrate that includes a display area and a non-display area, in which the non-display area has a liquid crystal injection hole. First metal layers are formed at the border of the display area. Second metal layer are formed above the substrate, in which the second metal layers partially overlap the first metal layers to prevent light from leaking through the liquid crystal injection hole at the border of the display area.

According to another aspect of the invention, a method of fabricating a TFT array substrate includes forming a first metal layer above a substrate that includes a display area and a non-display area, in which the border of the display area has a liquid crystal injection hole. The first metal layer is patterned to form gate electrodes and scan lines in the display area, and to form a quasi-metal layer above the substrate that is exposed by the opening of the liquid crystal injection hole. A gate insulation layer and an amorphous silicon layer is formed above the substrate. Portions of the amorphous silicon layer that are not directly above the gate electrodes are removed to form channel layers. A second metal layer is formed above the substrate and patterned to form source electrodes and drain electrodes above the gate electrodes, to form data lines above the substrate that extend to the liquid crystal injection hole. The data lines and the scan lines define pixel regions. The quasi-metal layer partially overlap the scan lines. The gate electrodes, the channel layers, the source electrodes, and the drain electrodes in combination form thin film transistors. A first color filter is formed above the substrate and patterned to preserve portions of the first color filter in the pixel region. A first color filter block is formed above the portion of the substrate that is exposed by the liquid crystal injection hole. Pixel electrodes are formed in the pixel region and electrically connected to corresponding TFTs.

According to another aspect of the invention, a method of fabricating a TFT array substrate includes providing a substrate that includes a display area and a non-display area, in which the border of the non-display area has a liquid crystal injection hole, characterized in that first metal layers are formed at the border of the display area, second metal layers are formed above the substrate, in which the second metal layers partially overlap the first metal layers. A first color filter block is formed above the portion of the substrate that is exposed by the liquid crystal injection hole.

According to another aspect of the invention, a TFT array substrate includes repair structures that includes a first metal layer, a second metal layer, an insulation layer, a channel layer, a dielectric layer, a transparent electrode layer, and at least one color filter. The first metal layer is disposed on a substrate that includes scan lines, gate electrodes, first repair metal layers. The insulation layer covers the first metal layer. The channel layer is disposed on the insulation layer above the gate electrode. The second metal layer is disposed above the substrate, and includes the source electrodes, the drain electrodes, the data lines, and the second repair metal layers. The source electrodes and the drain electrodes are disposed above the gate electrodes and are at the two sides of the channel layers. The data lines and the scan lines define pixel regions. The second repair metal layers and the first repair metal layers overlap each other to form the repair structures. The gate electrodes, the channel layers, the source electrodes, and the drain electrodes in combination form TFTs. The dielectric layer is disposed above the first metal layer, the insulation layer, and the second metal layer. The dielectric layer has repair openings and contact windows. The repair openings expose the second repair metal layers of the repair structures. The contact windows expose the source electrodes of the TFTs. The transparent electrodes are disposed above the dielectric layer, and includes pixel electrodes and floating electrodes. The pixel electrodes are disposed in the pixel regions and are electrically connected to the source electrodes of the corresponding TFTs through the contact windows. The floating electrodes are electrically connected to the second repair metal layers through the repair openings. The color filters are disposed in the pixel region away from the repair openings. A TFT LCD panel can be formed by adding an opposite substrate, and adding a liquid crystal layer between the two substrates.

According to another aspect of the invention, a method of fabricating a TFT array substrate includes forming a first metal layer on a substrate, patterning the first metal layer to form scan lines, gate electrodes, and first repair metal layers. A gate insulation layer and an amorphous layer are formed above the substrate, and the portions of the amorphous layer that are not directly above the gate electrodes are removed to form channel layers. A second metal layer is formed above the substrate, in which the second metal layer is patterned to form source electrodes, drain electrodes, data lines, and second repair metal layers. The source electrodes and the drain electrodes are disposed above the gate electrodes and are at the two sides of the channel layers. The data lines and the scan lines define pixel regions. The second repair metal layers overlap the first repair metal layers to form the repair structures. The gate electrodes, the channel layers, the source electrodes, and the drain electrodes in combination form thin film transistors. A dielectric layer is formed above the first metal layer, the insulation layer, and the second metal layer, wherein the dielectric layer includes repair openings and contact windows. The repair openings expose the second repair metal layers of the repair structures, and the contact windows expose the source electrodes of the thin film transistors. First color filters are formed in the pixel regions away from the repair openings. Second color filters are formed, covering portions of the first color filters above the substrate. A transparent electrode is formed above the substrate, the transparent electrode including pixel electrodes and floating electrodes. The pixel electrodes are electrically connected to the source electrodes of corresponding thin film transistors through the contact windows, and the floating electrodes are electrically connected to the second repair metal layers through the repair openings.

A TFT LCD panel can be formed by providing an opposite substrate that is spaced apart from the TFT array substrate, and forming a liquid crystal layer between the TFT array substrate and the opposite substrate.

According to another aspect of the invention, a method of fabricating a TFT array substrate includes forming a first metal layer on a substrate, the first metal layer including scan lines, gate electrodes, and first repair metal layers. An insulation layer is formed above the substrate covering the first metal layer, and channel layers are formed on the insulation layer above the gate electrodes. A second metal layer is formed above the substrate, the second metal layer including source electrodes, drain electrodes, data lines, and second repair metal layers. The source electrodes and the drain electrodes are disposed above the gate electrodes and are at the two sides of the channel layers. The data lines and the scan lines define pixel regions. The second repair metal layers overlap the first repair metal layers to form the repair structures. The gate electrodes, the channel layers, the source electrodes, and the drain electrodes form thin film transistors. A dielectric layer is formed above the first metal layer, the insulation layer, and the second metal layer, wherein the dielectric layer includes repair openings and contact windows. The repair openings expose the second repair metal layers of the repair structures, and the contact windows expose the source electrodes of the thin film transistors. Pixel electrodes are formed in the pixel regions, wherein the pixel electrodes are electrically connected to the source electrodes of corresponding thin film transistors through the contact windows. At least one color filter is formed above the pixel regions outside of the repair openings.

According to another aspect of the invention, a TFT array substrate having storage capacitors includes a first metal layer, a second metal layer, an insulation layer, a channel layer, a dielectric layer, pixel electrodes, and color filters. The first metal layer is disposed on a substrate, the first metal layer including scan lines, gate electrodes, and first storage capacitor metal layers, in which the first storage capacitor metal layers have first openings. The insulation layer covers the first metal layer. The channel layers are disposed on the insulation layer above the gate electrodes. A second metal layer is disposed above the substrate, the second metal layer including source electrodes, drain electrodes, data lines, and second storage capacitor metal layers. The source electrodes and the drain electrodes are disposed above the gate electrodes and at the two sides of the channel layers. The data lines and the scan lines define pixel regions. The second storage capacitor metal layers overlap the first storage capacitor metal layers, and the first and second storage capacitors and the insulation layer form storage capacitors. The gate electrodes, the channel layers, the source electrodes, and the drain electrodes form thin film transistors. A dielectric layer is disposed above the first metal layer, the insulation layer, and the second metal layer, wherein the dielectric layer has second openings and third openings. The second openings approximately expose the second storage capacitor metal layers above the first openings, and the third openings expose the source electrodes of the thin film transistors. Pixel electrodes are disposed in the pixel regions. The pixel electrodes are electrically connected to the second storage capacitor layers through the second openings, and are electrically connected to the source electrodes of corresponding thin film transistors through the third openings. Color filters are disposed on the pixel regions outside of the second openings.

Further, a TFT LCD panel can be formed by providing an opposite substrate and forming a liquid crystal layer between the two substrates.

According to another aspect of the invention, a method of fabricating a TFT array substrate includes forming a first metal layer on a substrate, patterning the first metal layer to form scan lines, gate electrodes, and first storage capacitor metal layers, the first storage capacitor metal layers having first openings. An insulation layer is formed above the substrate, and a patterned amorphous silicon layer is formed above the gate electrodes to form channel layers. A second metal layer is formed above the substrate, and the second metal layer is patterned to form source electrodes, drain electrodes, data lines, and second storage capacitor metal layers. The source electrodes and the drain electrodes are disposed above the gate electrodes and at the two sides of the channel layers. The data lines and the scan lines define pixel regions. The second storage capacitor metal layers overlap the first storage capacitor metal layers. The first storage capacitor metal layers, the second storage capacitor metal layers, and the insulation layers in combination form storage capacitors. The gate electrodes, the channel layers, the source electrodes, and the drain electrodes form thin film transistors. A dielectric layer is formed above the first metal layer, the insulation layer, and the second metal layer, wherein the dielectric layer has second openings and third openings. The second openings approximately expose the second storage capacitor metal layers above the first openings, and the third openings expose the source electrodes of the thin film transistors. Color filters are formed in the pixel regions outside of the second openings. Pixel electrodes are formed above the substrate. The pixel electrodes are electrically connected to the second storage capacitor layers through the second openings, and electrically connected to the source electrodes of corresponding thin film transistors through the third openings.

Further, a TFT LCD panel can be formed by providing an opposite substrate that is spaced apart from the TFT array substrate and forming a liquid crystal layer between the TFT array substrate and the opposite substrate.

According to another aspect of the invention, a method of fabricating a TFT array substrate includes forming a first metal layer on a substrate, the first metal layer including scan lines, gate electrodes, and first storage capacitor metal layers, in which the first storage capacitor metal layers have first openings. An insulation layer is formed above the substrate to cover the first metal layer, and channel layers are formed on the insulation layer above the substrate. A second metal layer is formed above the substrate, the second metal layer including source electrodes, drain electrodes, data lines, and second storage capacitor metal layers. The source electrodes and the drain electrodes are disposed above the gate electrodes and at the two sides of the channel layers. The data lines and the scan lines define pixel regions. The second storage capacitor metal layers overlap the first storage capacitor metal layers. The first storage capacitor metal layers, the second storage capacitor metal layers, and the insulation layers form storage capacitors. The gate electrodes, the channel layers, the source electrodes, and the drain electrodes form thin film transistors. A dielectric layer is formed above the first metal layer, the insulation layer, and the second metal layer, wherein the dielectric layer has second openings and third openings. The second openings approximately expose the second storage capacitor metal layers above the first openings, and the third openings expose the source electrodes of the thin film transistors. Pixel electrodes are formed in the pixel regions. The pixel electrodes are electrically connected to the second storage capacitor layers through the second openings, and are electrically connected to the source electrodes of corresponding thin film transistors through the third openings. Color filters are formed in the pixel regions outside of the second openings.

According to the present invention, color filter stacks are formed above the thin film transistors to replace a black matrix, so fabrication time and cost can be reduced.

The TFT array substrate according to the present invention can use color filter stacks and partially overlapping metal layers at the border of a display area to achieve good light shielding effects.

The TFT array substrate according to the present invention uses partially overlapping metal layers and color filter blocks at a liquid crystal injection hole of a display area, so good light shielding effects can be achieved, and the size of the liquid crystal injection hole can be increased.

According to the present invention, only a passivation layer covers the welding point of the repair structure of the TFT array substrate, so dielectric layer bursts (which may occur in a prior art structures due to the presence of a dielectric layer at the welding point) will not occur during the repair process.

The TFT array substrate of the present invention has integrated color filters and has storage capacitors having welding points similar to those used for repair structures. The electrical connection between the storage capacitor metal layer and the pixel electrode is improved, thus increasing the effectiveness of the LCD panel. Because the first metal layer is positioned away from the opening used for the welding point, short-circuiting of the first and second metal layers during the welding process can be prevented.

The present invention uses color filter stacks to replace the black matrix, so fabrication time and cost can be reduced. Improvements have been made in the structure and the fabrication process, responsive to particular requirements of different parts of the LCD panel, and taking into account the basic manufacturing process flow, allowing fabrication time and cost of the LCD panel to be reduced.

The following description and accompanying figures provide examples of preferred embodiments to allow easy understanding of the objects, characteristics, and advantages of the invention.

DESCRIPTION

This invention relates to providing different designs for different portions of a TFT array substrate having integrated color filters, referred to as color filter on array (COA), to meet the requirements of various fabrication processes or applications. Fabrication of a black matrix can be omitted. The following embodiments are used as examples to describe the various applications of the present invention.

THE FIRST EMBODIMENT

Figure 1:
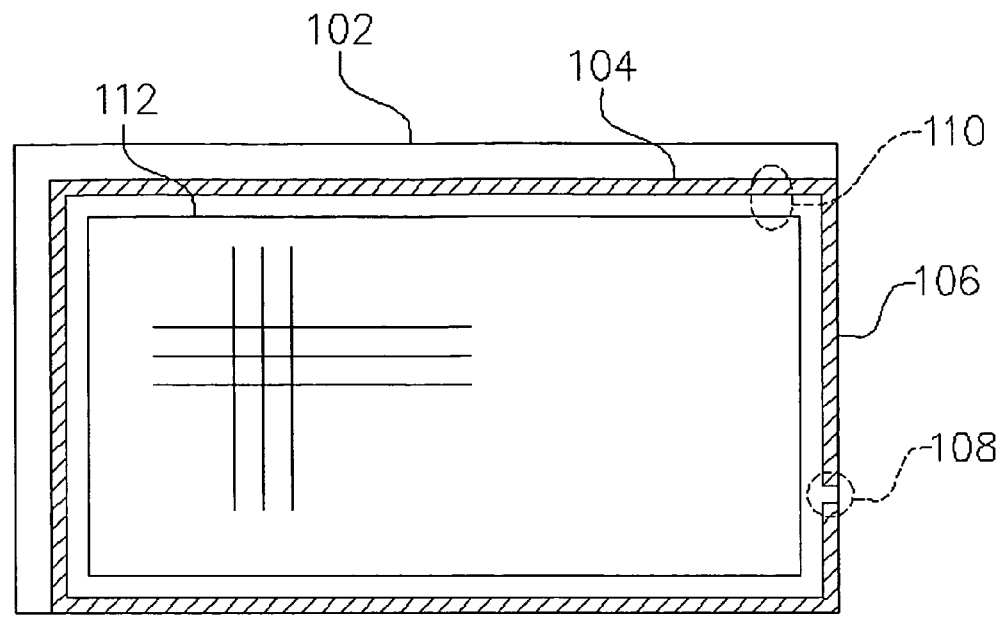
FIG. 1 shows a schematic diagram of a conventional TFT LCD panel.
Figure 2:
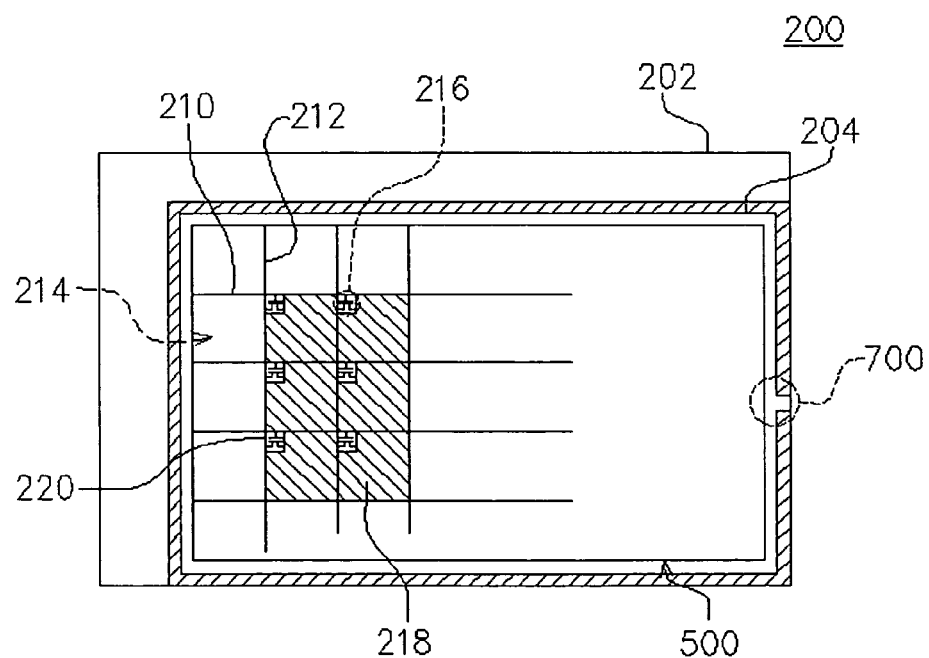
FIG. 2 shows a cross-sectional view of a TFT LCD panel according to the present invention.

FIG. 2 shows a schematic diagram of a TFT LCD panel according to the present invention.

Referring to FIG. 2, a TFT LCD panel 200 according to the present invention includes a TFT array substrate 202, an opposite substrate 204, and a liquid crystal layer (not shown) that is positioned between the substrates 202 and 204. On the TFT array substrate 202, there are scan lines 210, data lines 212, thin film transistors 216, pixel electrodes 218, color filters (not referenced with labels), and color filter stacks 220. The data lines 212 and the scan lines 210 define pixel regions 214. Thin film transistors 216 are disposed at the intersections of data lines 212 and scan lines 210, and are controlled by using the data lines 212 and the scan lines 210. Pixel electrodes 218 are disposed in the pixel regions 214 and are connected to corresponding thin film transistors 216.

The color filters (not shown) are disposed above the pixel region 214, in which the color filters include red filters, green filters, and blue filters (the filters are in the form of thin films). The color filter stacks 220 are disposed on the color filters above the TFT 216. When the color filter is of a first color, the color filter stack 220 can be, for example, overlapping color filters of a second color and a third color, or can be a single color filter of the second color, or a single color filter of the third color. When the color filter stack 220 is formed by overlapping color filters of the second and third colors, the color filter that is closer to the TFT 216 is thicker than the color filter that is farther away from the TFT 216.

Because the blue filter has a higher absorption rate than the red and green filters, when only one color filter is used, it would be better to use a blue filter. FIGS. 3A to 3D show the fabrication process for the present embodiment.

Figure 3A:
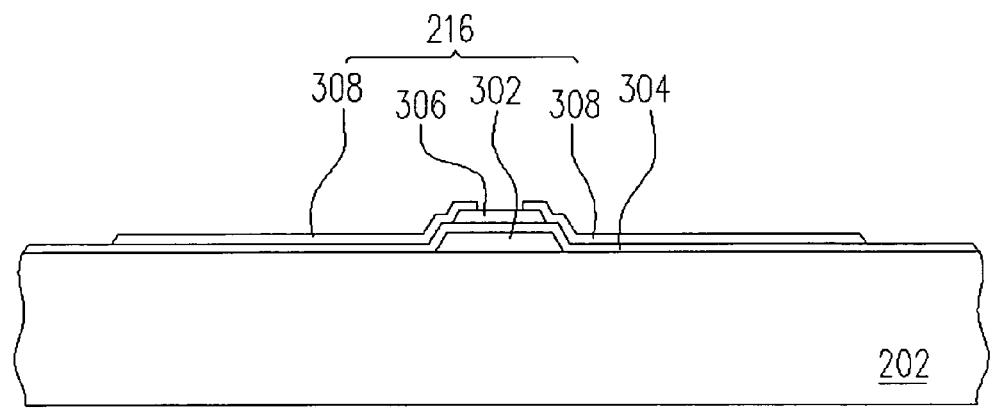
FIGS. 3A to 3D show cross-sectional process views of a TFT array substrate according to a first embodiment of the invention.

FIGS. 3A to 3D depict cross-sectional process views showing a method of fabricating a TFT array substrate according to the first embodiment of the present invention. Referring to FIGS. 2 and 3A, a first metal layer is formed on the substrate 202. The first metal layer is patterned to form gate electrodes 302 and scan lines 210 (FIG. 2). A gate insulation layer 304 and an amorphous silicon layer are formed above the substrate 202. The portions of the amorphous silicon layer that is not directly above the gate electrode are removed, forming channel layers 306 (there is one channel layer, the plural term "channel layers" refers to multiple portions of the channel layer). A second metal layer is formed above the substrate 202. The second metal layer is patterned to form source electrodes and drain electrodes 308 above the gate electrodes 302, and to form data lines 212 (FIG. 2) above the substrate 300. The data lines and the scan lines define pixel regions 214 (FIG. 2). The gate electrodes 302, the channel layers 306, the source electrodes, and the drain electrodes 308 in combination form thin film transistors 216.

Figure 3B:
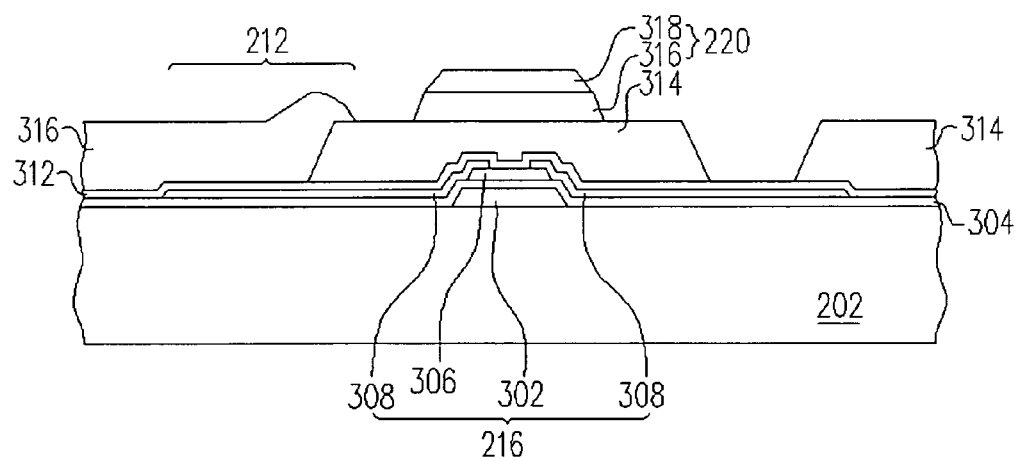

Referring to FIGS. 2 and 3B, a passivation layer 312 is formed above the thin film transistor 216. A first color filter 314 is formed in the pixel region 214 (hereafter, the term "first color filter" refers to a color filter that allows a first color to pass). A color filter stack 220 is formed above the first color filter 314, which is above the TFT 216. The color filter stack 220 includes a second color filter 316 and a third color filter 318 (hereafter, the terms "second color filter" and "third color filter" refer to color filters that allow a second color and a third color, respectively, to pass). The color filter 314 shown at the right portion of FIG. 3B is part of the color filter for the pixel that includes the TFT 216. The second color filter 316 shown at the left portion of FIG. 3B is part of the color filter for another pixel. Portions of the adjacent color filters 314 and 316 overlap at the data line 212 and the scan line 210.

Figure 3C:
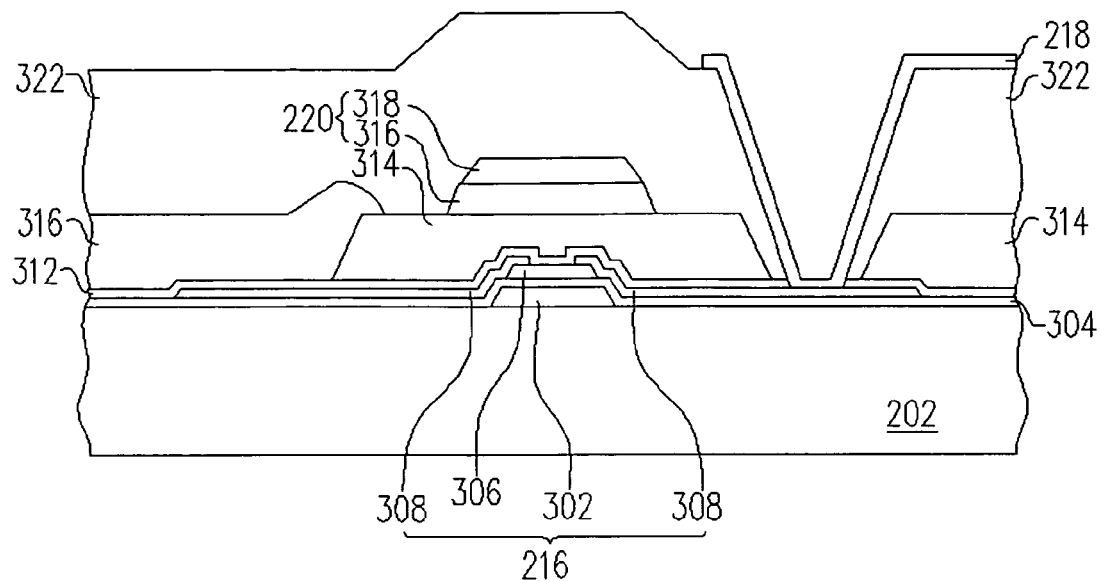

Referring to FIG. 3C, a dielectric layer 322 is formed above the substrate 202 and covers the entire substrate 202. As an example, the dielectric layer 322 can be made of acrylic acid. A pixel electrode 218 is formed above the dielectric layer 322 and is electrically connected to the drain electrode 308 of the thin film transistor 216.

Figure 3D:
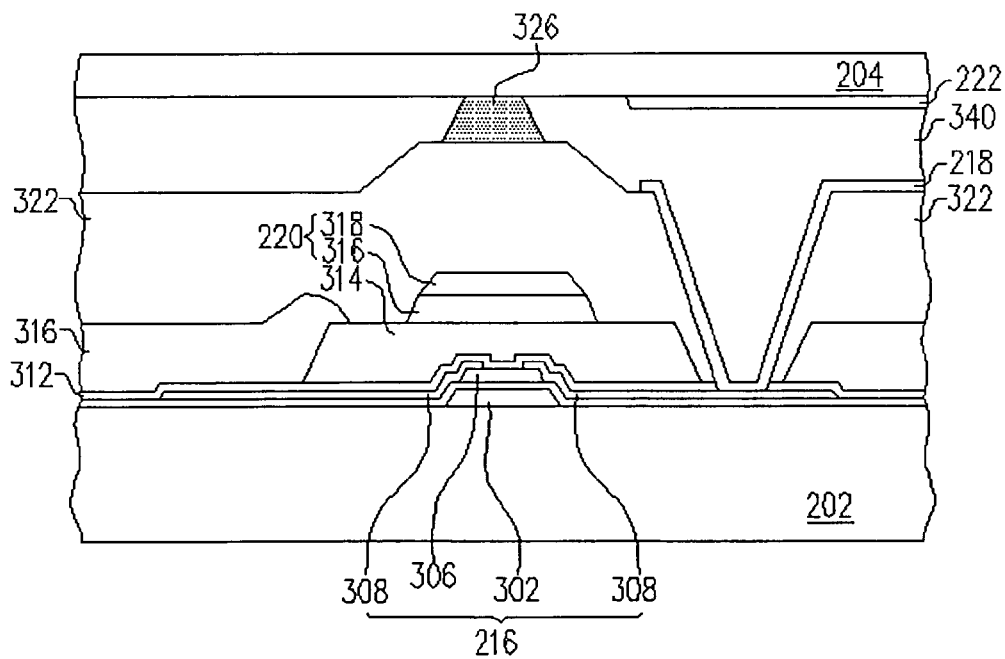

FIG. 3D shows a cross-sectional view of the TFT LCD display panel that includes an opposite substrate 204, which is spaced apart from the TFT array substrate 202 (FIG. 3C). The opposite substrate 204 includes a common electrode 222. A liquid crystal layer 340 is formed between the opposite substrate 204 and the TFT array substrate 202. Prior to forming the liquid crystal layer 340, a photo spacer 326 can be formed above the dielectric layer 322 to maintain a predefined cell gap. An orientation layer (not shown) can be positioned between the TFT array substrate 202 and the liquid crystal layer 340. Another orientation layer (not shown) can be positioned between the opposite substrate 204 and the liquid crystal layer 340. In addition, a polarizer (not shown) can be disposed at each of the outer surface of the TFT array substrate 202 and the outer surface of the upper substrate 204.

Figure 4:
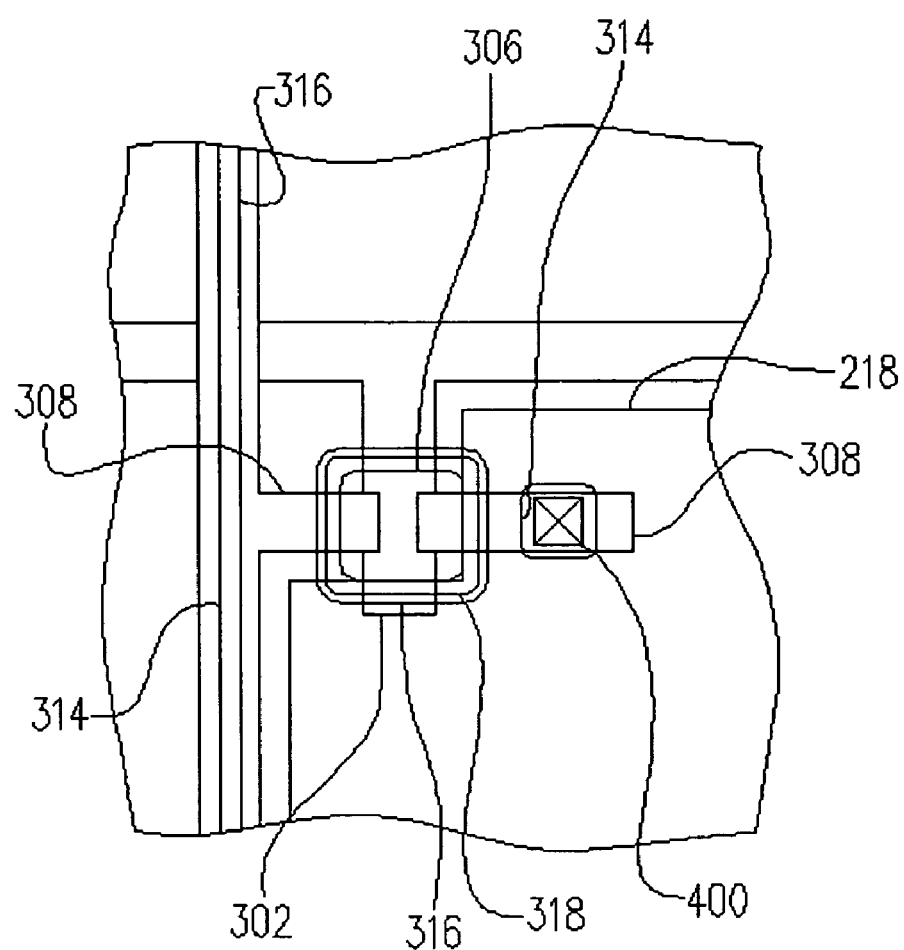
FIG. 4 shows a top view of the TFT array substrate according to the first embodiment of the invention.

FIGS. 3D and 4 depicts the structure of the current embodiment. FIG. 4 shows a top view of the TFT array substrate according to the first embodiment of the invention.

Referring to FIGS. 3D and 4, a color filter stack 220 according to the present invention is positioned above the TFT 216, in which the second and third color filters 316 and 318 are stacked one over the other above the first color filter 314. The first color filter 314 is the color filter for the pixel region 214 (FIG. 2), and has an opening 400 to expose the pixel electrode 218 and the electrical contact portion of the drain electrode 308 of the TFT 216. A second or third color filter 316 or 318 covers another side of the pixel structure, and its borders can overlap the first color filter 314. The second or third color filter 316 or 318 can be the color filter of another pixel region.

THE SECOND EMBODIMENT

This embodiment improves the border of the display area of the TFT LCD panel. Referring to FIG. 2, a display area 500 refers to the region that includes pixel regions 214 and can display patterns and colors. The regions outside of the display area 500 are referred to as the non-display area.

Figure 5A:
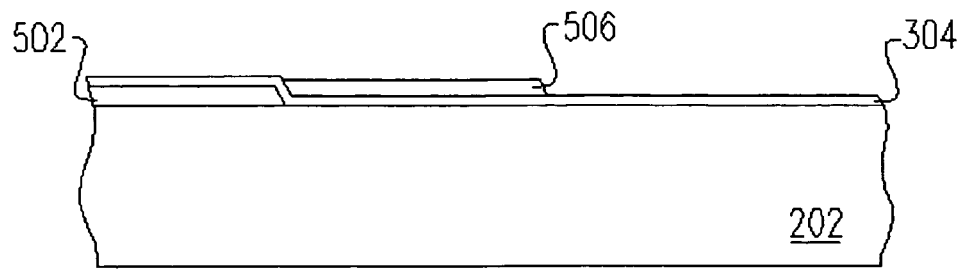
FIGS. 5A to 5C show cross-sectional process views of a TFT LCD panel according to a second embodiment of the invention.
Figure 5B:
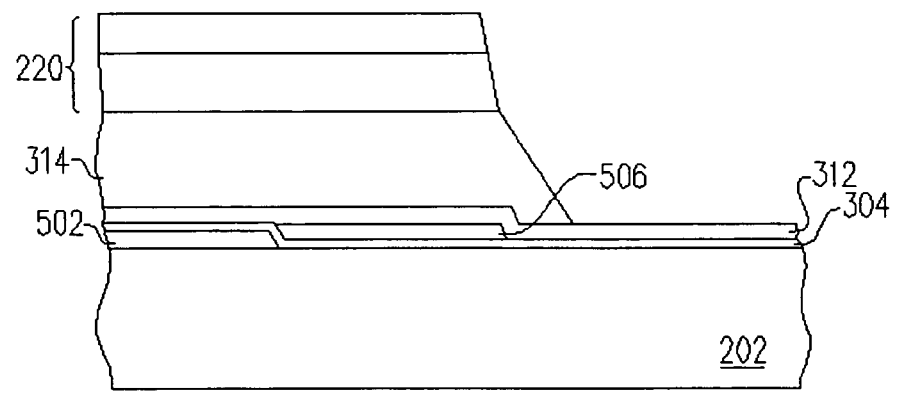
Figure 5C:
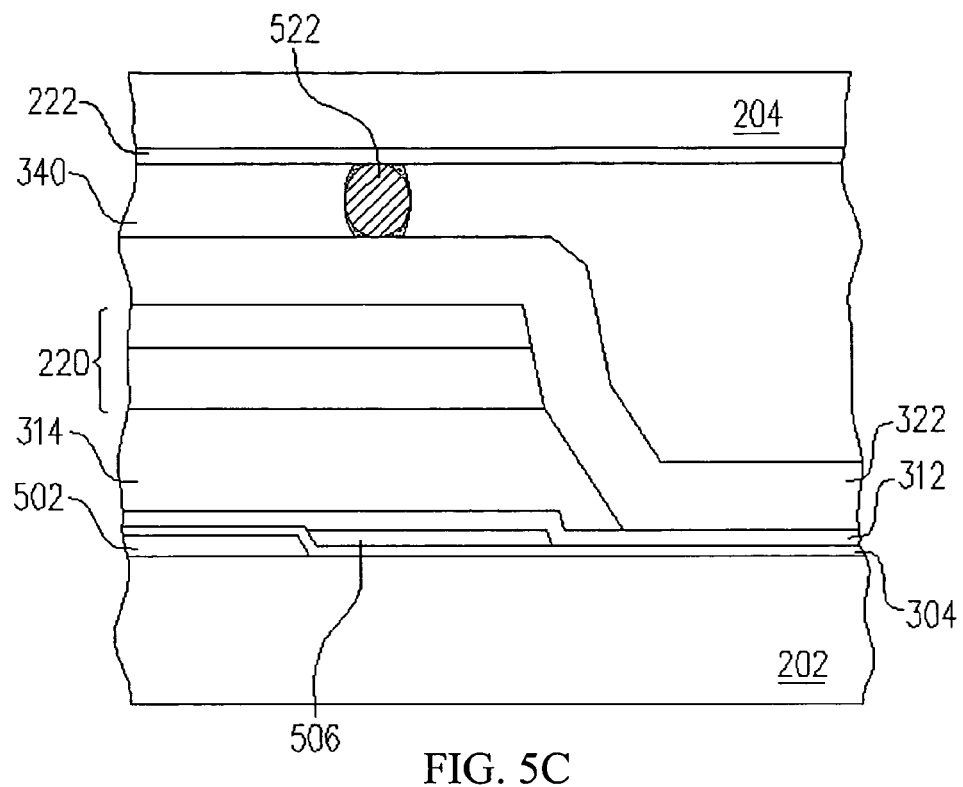

FIGS. 5A to 5C depict cross-sectional process views showing a method of fabricating a TFT LCD panel according to a second embodiment of the present invention. The differences between the first and second embodiments are as follows.

Figure 5D:
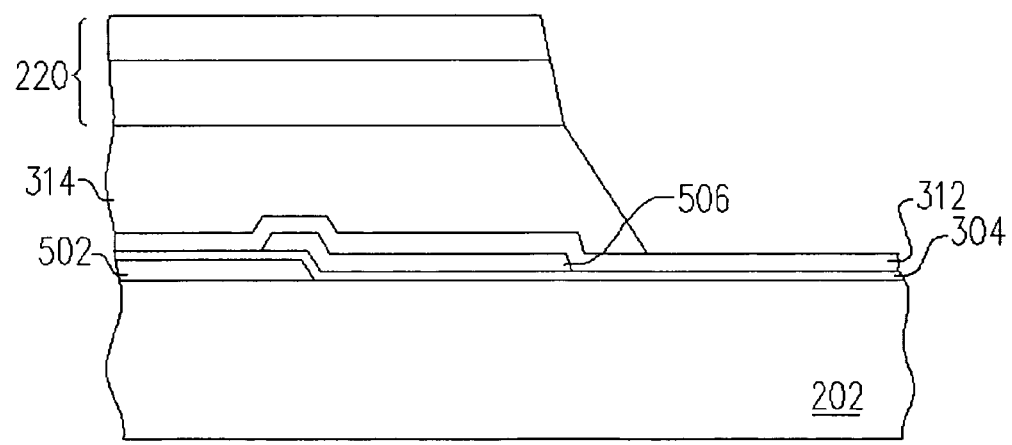
FIG. 5D shows a cross-sectional view of the TFT LCD panel according to the second embodiment of the invention.

Referring to FIG. 5A, the first metal layer is formed above the substrate 202. The first metal layer is patterned to generate the structure shown in FIG. 3A and a first metal layer 502 at the border of the display area 500. A gate insulation layer 304 is formed above the substrate 202, and is used for insulation. A second metal layer is formed above the substrate. The second metal layer is patterned to form the structure shown in FIG. 3A and another metal layer 506 at the border of the display area 500. The metal layers 502 and 506 are adjacent to each other, preferably partially overlapping each other (as shown in FIG. 5D) to prevent light from leaking at the border of the display area 500.

When the metal layer 502 is used for external connection lines, the metal layer 502 is connected to scan line 210, and the metal layer 506 acts as a "quasi-metal layer" for forming dummy lines. Conversely, when the metal layer 506 is used for external connection lines, the metal layer 506 is connected to the data line 212, and the metal layer 502 serves as a quasi-metal layer. Metal layers 502 and 506 can simultaneously act as quasi-metal layers and not connect to the scan line 210 or the data line 212. By positioning the metal layers 502 and 506 adjacent to each other, or partially overlapping each other (as shown in FIG. 5D), light directed towards the non-display area can be shielded, preventing light leakage.

Referring to FIG. 5B, a passivation layer 312 is formed above the substrate 202. Optionally, at least one color filter can be formed above the substrate at the border of the display area 500 to enhance the light shielding effect. In the example shown in FIG. 5B, a color filter stack 220 is formed above a first color filter 314 above the TFT 216 (FIG. 2). The color filter stack 220 can also be a single layer of the second color filter or the third color filter.

Referring to FIG. 5C, a dielectric layer 322 is formed above the substrate 202, covering the color filter stack 220. A frame sealant 522, such as a frame sealant that has ball spacers, is formed on the substrate 202. The opposite substrate 204 is provided and glued to the TFT array substrate.

Please note that in the present embodiment, although the color filter stack 220 and the adjacent or partially overlapping metal layers 502 and 506 are formed above the substrate 202, as shown in FIGS. 5A and 5D, all that is required is to form a structure that can shield light at the border of the display area 500 of the TFT array substrate. In one example, during the fabrication process described above, the fabrication of the color filter stack 220 can be omitted, and only the adjacent or partially overlapping metal layers 502 and 506 are formed. In another example, the adjacent or partially overlapping metal layers 502 and 506 are omitted, and only the color filter stack 220 is formed.

Figure 6:
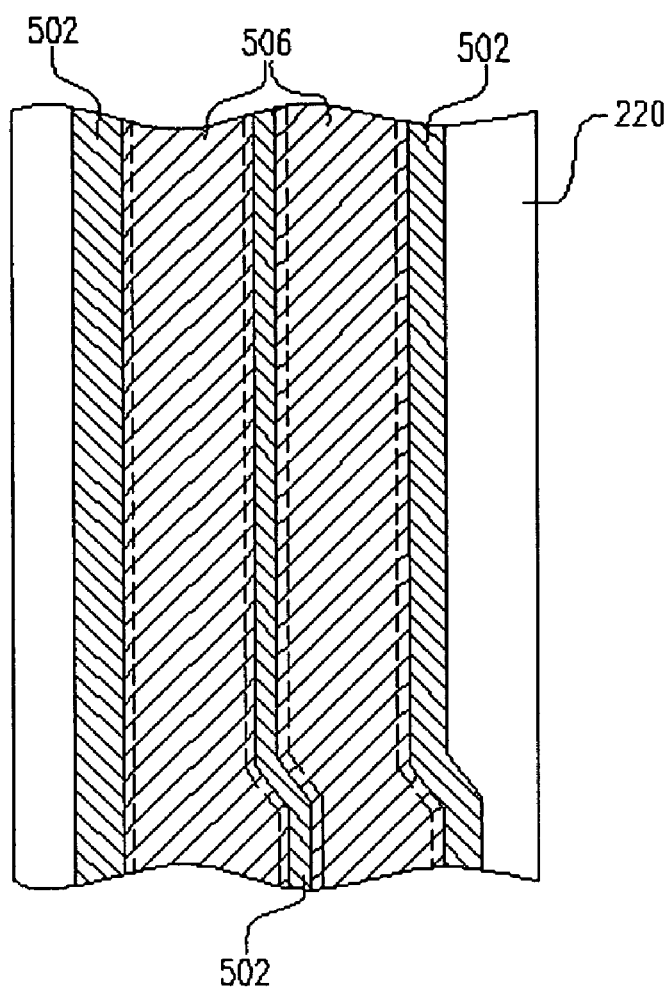
FIG. 6 shows a top view of a border of a display area of the TFT array substrate according to the second embodiment of the invention.

FIGS. 5C and 6 depict the structure of the present embodiment. FIG. 6 shows a top view of the border of the display area of the TFT LCD panel according to the second embodiment.

Referring to FIGS. 5C and 6, the color filter stack 220 of the present embodiment is positioned at the border of the display area 500, and the metal layers 502 and 506 are positioned between the color filter stack 220 and the substrate 202. The metal layers 502 and 506 are electrically insulated from each other, and are adjacent to or partially overlap each other to prevent light leakage. The structure according to the present embodiment can be chosen to have only one color filter stack 220 at the border of the display area 500, or to have only adjacent or partially overlapping metal layers 502 and 506 at the border of the display area 500. Light shielding effects can be achieved by either having only the color filter stack 220, only the adjacent or partially overlapping metal layers 502 and 506, or both.

THE THIRD EMBODIMENT

This embodiment mainly relates to improving the liquid crystal injection hole at the border of the display area of the TFT LCD panel. Referring to FIG. 2, the liquid crystal injection hole 700 is positioned at the border of the display area 500. Liquid crystal can be injected from this hole.

Figure 7A:
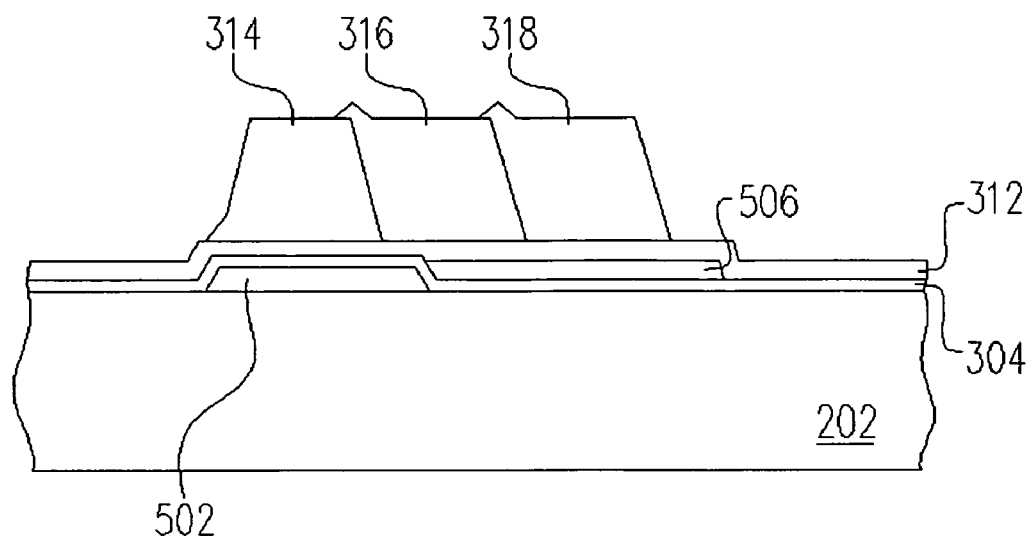
FIGS. 7A to 7B show cross-sectional process views of a TFT LCD panel according to a third embodiment of the invention.
Figure 7B:
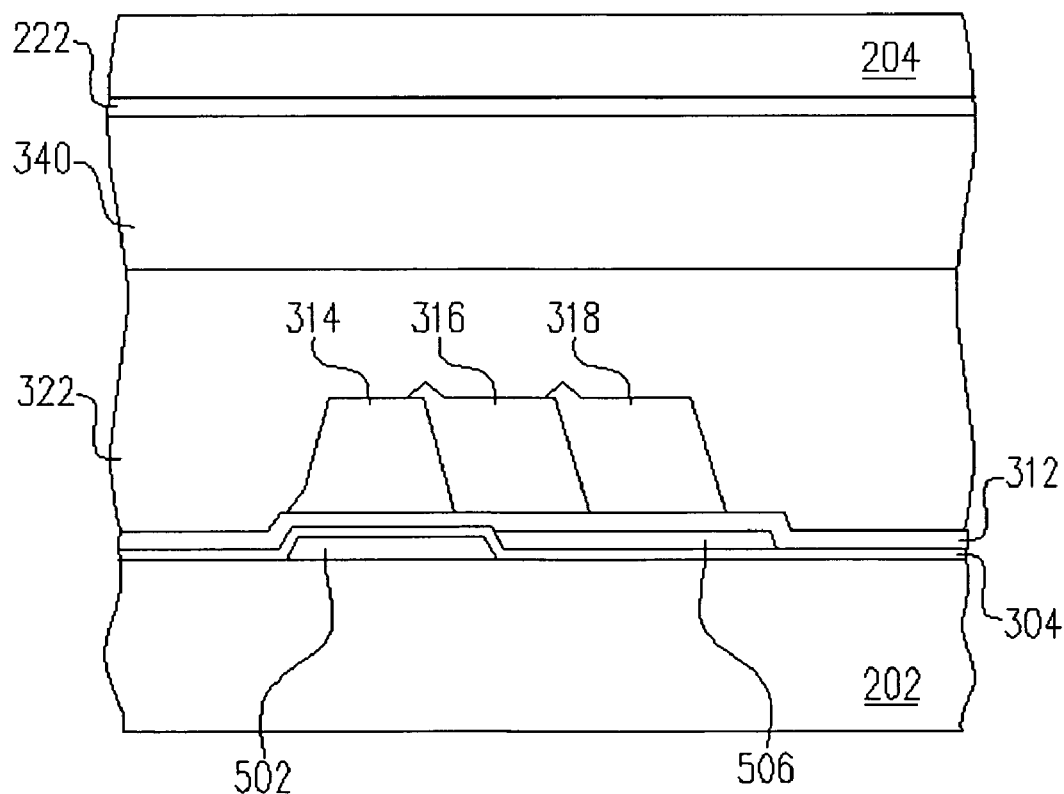

FIGS. 7A and 7B depict cross-sectional process views showing a method of fabricating a TFT LCD panel according to a third embodiment of the present invention. The third embodiment is similar to the second embodiment, except for the steps after forming the adjacent or partially overlapping metal layers 502 and 506. Referring to FIG. 7A, to facilitate injection of the liquid crystal, the liquid crystal injection hole 700 is made to have a larger diameter. Multiple color filter blocks can be formed on the portion of the substrate 202 that is exposed by the liquid crystal injection hole 700 to enhance the light shielding effect. For example, in these figures, three color filter blocks 314, 316, and 318 are formed adjacent to each other at the position where the liquid crystal injection hole is located. These three color filter blocks are formed at the same time as when the color filter 314 and the color filter stack 220 of the second embodiment are formed.

Referring to FIG. 7B, a dielectric layer 322 is formed above the substrate 202, in which the dielectric layer 322 covers the color filter blocks 314, 316, and 318. The remaining fabrication steps are similar to those of the second embodiment. In the third embodiment, although the color filter blocks 314, 316, and 318, and the adjacent or partially overlapping metal layers 502 and 506 are formed above the substrate, it is also possible to use other structures that have light shielding effects.

Figure 8:
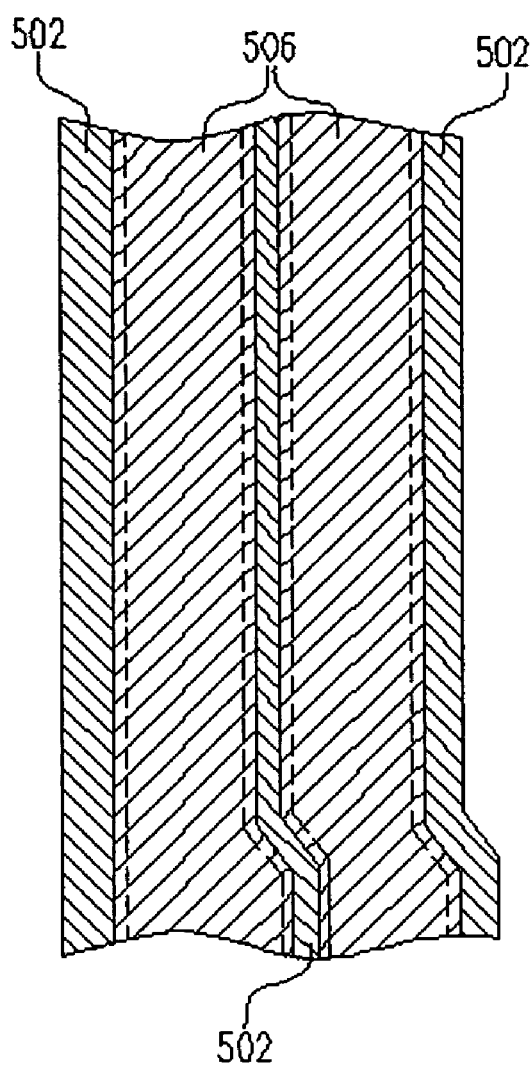
FIG. 8 shows a top view of a liquid crystal injection hole of a TFT array substrate according to the third embodiment of the invention.

FIGS. 7B and 8 shows a structure of this embodiment, in which FIG. 8 shows a top view of the TFT array substrate where the liquid crystal injection hole is located. Referring to FIGS. 7B and 8, a larger space is reserved between the TFT array substrate 202 and the opposite substrate 204 for the liquid crystal injection hole 700 (FIG. 2) to facilitate injection of liquid crystal. The difference between the third embodiment and the second embodiment is that, in the third embodiment, the color filters are formed as blocks that are adjacent to each other to allow the height of the color filters to be lowered, so that the distance between the dielectric layer 322 and the substrate 202 meets the requirements for liquid crystal injection.

The TFT LCD panel according to the third embodiment can selectively use the adjacent or partially overlapping metal layers 502 and 506, without using the color filters 314, 316, and 318, and still achieve the light shielding effect and prevent light leakage.

THE FOURTH EMBODIMENT

This embodiment is mainly relates to improvement in the repair structure of the TFT array substrate.

Figure 9A:
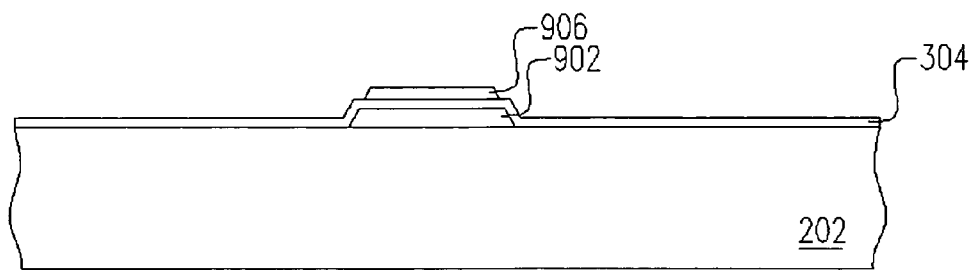
FIGS. 9A to 9D show cross-sectional process views of a TFT array substrate according to a fourth embodiment of the invention.
Figure 9B:
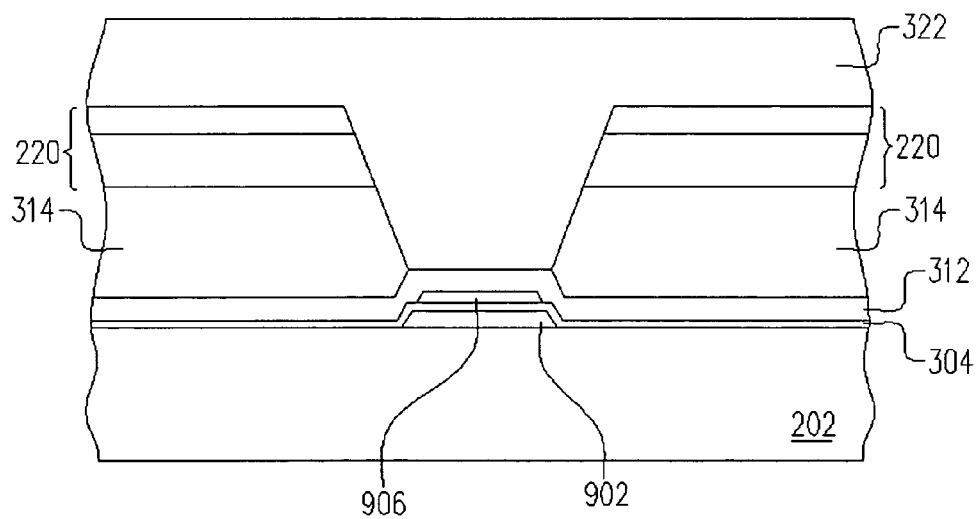
Figure 9C:
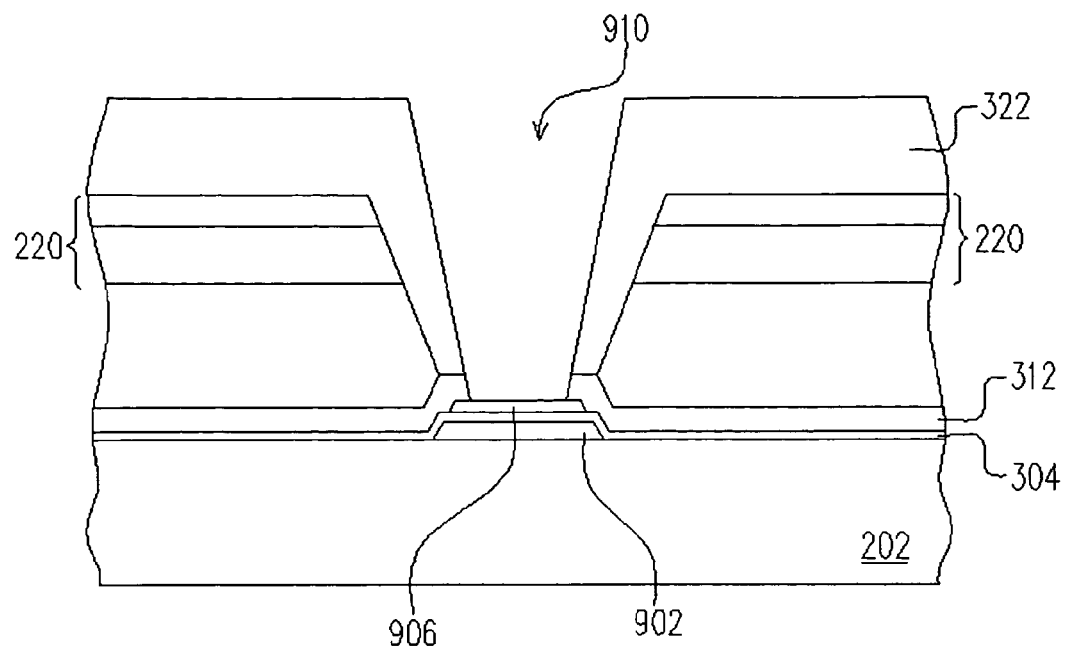

FIGS. 9A to 9C are cross-sectional process views showing a method of fabricating the TFT array substrate according to a fourth embodiment of the present invention, which can be used with the fabrication process of the first embodiment.

Referring to FIG. 9A, a first metal layer is formed and patterned on the substrate 202 to form first repair metal layers 902 (there is one first repair metal layer, the plural term "first repair metal layers" refers to multiple portions of the first metal layer) in addition to the structure shown in FIG. 3A. Afterwards, the processing steps are similar to the processing steps of the first embodiment. An insulation layer 304 is formed above the substrate 202. A second metal layer is formed and patterned on the substrate 202 to form second repair metal layers 906 (there is one second repair metal layer, the plural term "second repair metal layers" refers to multiple portions of the second repair metal layer) in addition to the structure shown in FIG. 3A. The second repair metal layer 906 and the first repair metal layer 902 in combination form a repair structure. The repair metal layers 902 and 906 can be adjacent to each other or have portions that overlap, and are positioned within the pixel region 214 (FIG. 2).

Referring to FIG. 9B, a passivation layer 312 is formed above the substrate 202, covering the second repair metal layer 906 and the insulation layer 304. A color filter 314 and a color filter stack 220 (which is positioned above the color filter 314) can be formed in portions of the pixel region that are not directly above the second repair metal layer 906. For example, the color filter stack 220 according to the first embodiment is formed above the TFT 216. A dielectric layer 322 is formed above the substrate 202, covering the entire substrate 202.

Referring to FIG. 9C, a dielectric layer 322 and a passivation layer 312 are defined to form an opening 910 for the welding point of the repair structure, and to expose the second repair metal layer 906.

Figure 9D:
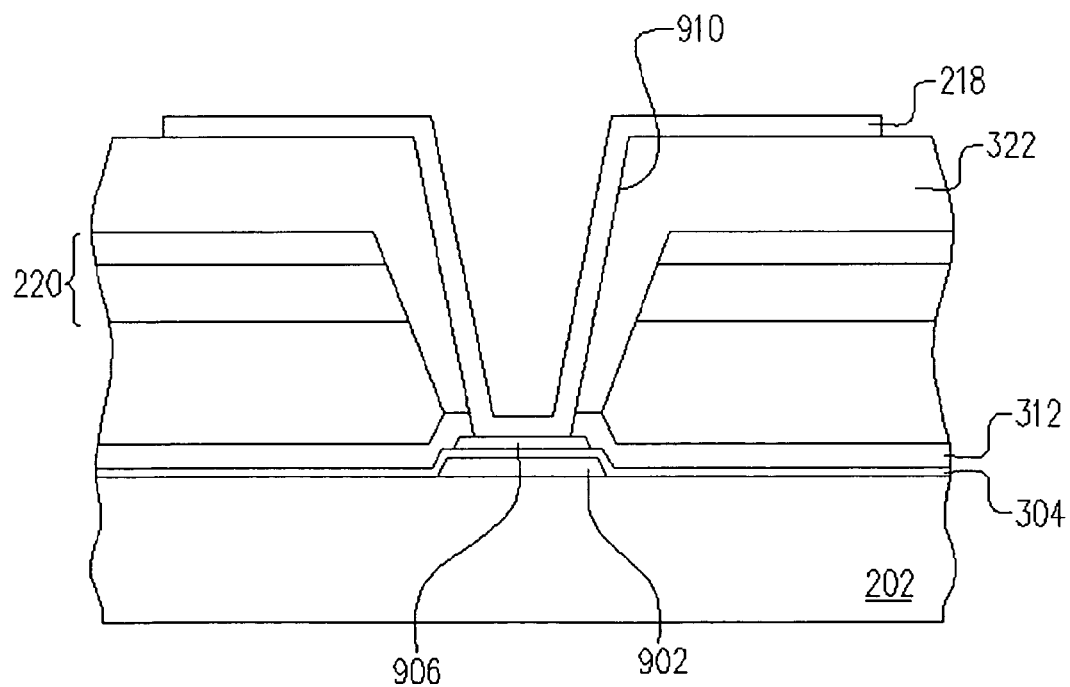

Referring to FIG. 9D, a pixel electrode 218 is formed above the dielectric layer 322. The pixel electrode 218 is electrically floated and disposed at the surface at the opening 910 to cover and protect the exposed second repair metal layer 906. Layers other than the pixel electrode 218 can also be used as the passivation layer. Because the welding point (the opening 910) of the repair structure according to the present invention is protected by only a pixel electrode, dielectric layer bursts (which may occur in prior art structures) will not occur during the repair process.

Figure 10:
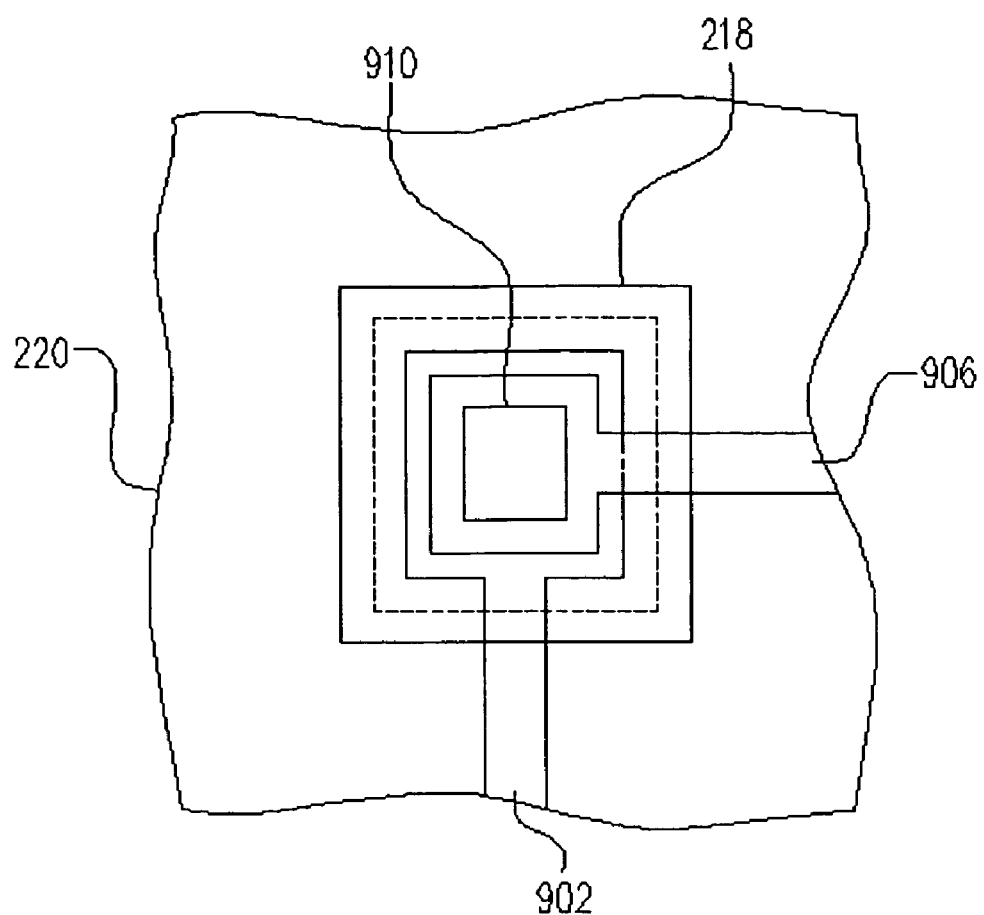
FIG. 10 shows a top view of repair structure of a TFT array substrate according to a fourth embodiment of the invention.

FIGS. 9D and 10 show the structure of a TFT LCD panel according to the fourth embodiment, in which FIG. 10 is a top view of a repair structure for a TFT array substrate according to the fourth embodiment of the invention.

Referring to FIGS. 9D and 10, the difference between the structures of the first and fourth embodiments is that, in the fourth embodiment, there is only one pixel electrode 218 that serves as a protection layer covering the welding point (which is at the opening 910) of the repair structure. The repair structure includes the first repair metal layer 902 and the second repair metal layer 906. In addition, in the fourth embodiment, the color filter 314 and the color filter stack 220 are disposed at a location away from the welding point (which is at the opening 910).

THE FIFTH EMBODIMENT

Figure 11A:
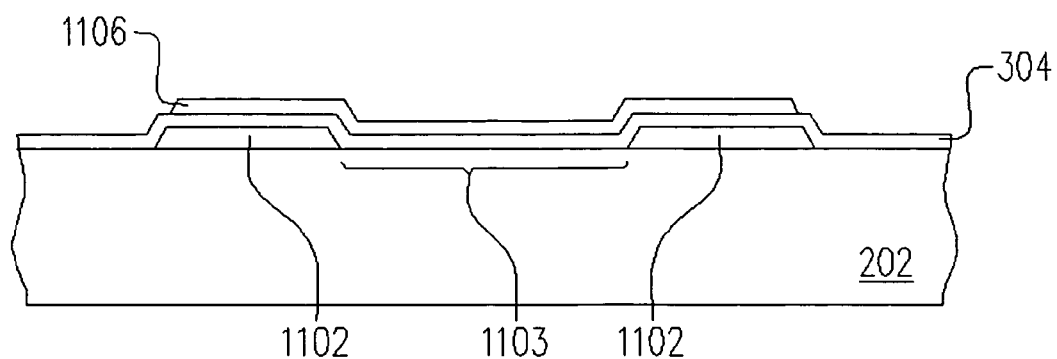
FIGS. 11A to 11D show cross-sectional process views of a storage capacitor of a TFT array substrate according to a fifth embodiment of the invention.
Figure 11B:
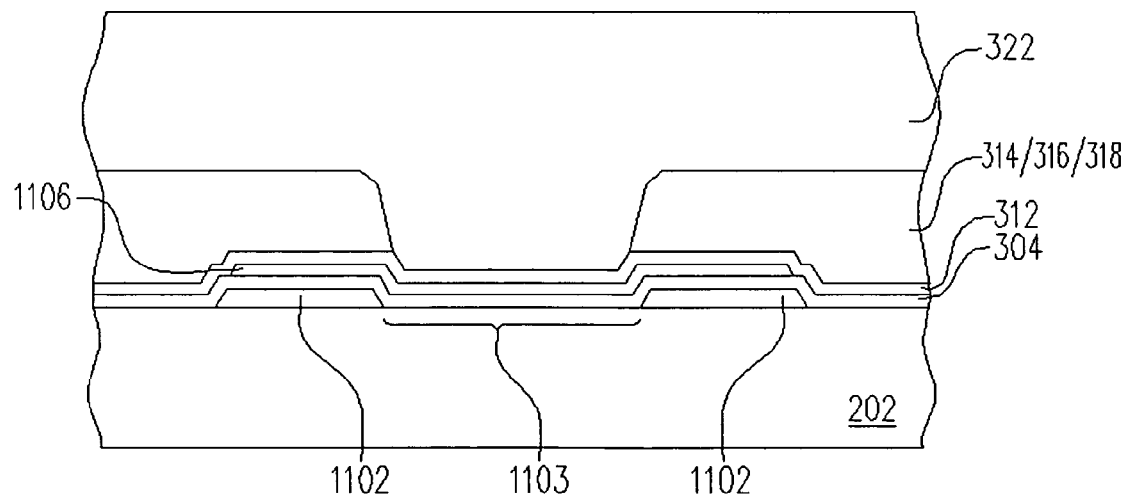
Figure 11C:
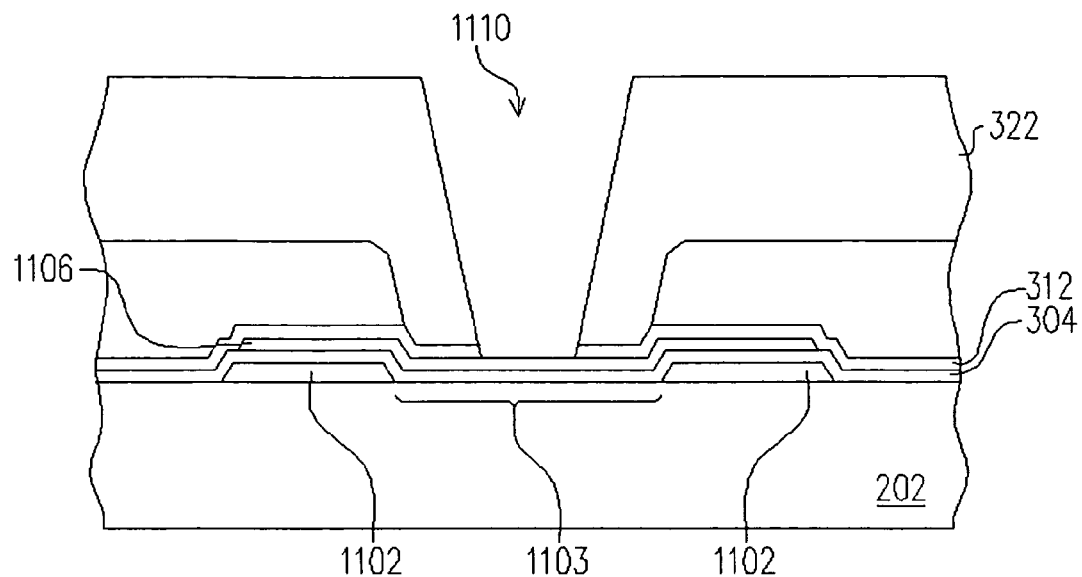

FIGS. 11A to 11C are cross-sectional process views showing a method of fabricating a storage capacitor of the TFT array substrate according to a fifth embodiment of the present invention. The fifth embodiment is similar to the fourth embodiment, wherein the difference between the fifth and fourth embodiments is that, the partially overlapping metal layers of the first metal layer that is formed and patterned above the substrate 202 has first storage capacitor metal layers 1102 (the plural term "first storage capacitor metal layers" refers to multiple portions of the first storage capacitor metal layer), as shown in FIG. 11A, in addition to the structure shown in FIG. 3A. The first storage capacitor metal layer 1102 has first openings 1103, and the first storage capacitor metal layer 1102 can be a part of the scan line or a part of a common line. Afterwards, the processing steps are similar to those of the fourth embodiment. An insulation layer 304 is formed above the substrate 202. A second metal layer is formed above the substrate 202, and is patterned to have, in addition to the structure shown in FIG. 3A, second storage capacitor metal layers 1106 (the plural term "second storage capacitor metal layers" refers to multiple portions of the second storage capacitor metal layer). The second storage capacitor metal layer 1106 overlaps the insulation layer 304, which overlaps the first storage capacitor metal layer 1102. The second storage capacitor metal layer 1106, the insulation layer 304, and the first storage capacitor metal layer 1102 in combination form a storage capacitor.

Referring to FIG. 11B, a passivation layer 312 is formed above the substrate 202, covering the second storage capacitor metal layer 1106 and the insulation layer 304. A color filter 314, 316, or 318 is formed above the portions of the passivation layer 312 that is outside of the opening 1103. A dielectric layer 322 is formed above the substrate 202. Here, the color filter 314, 316, or 318 are used as the color filters of each pixel region.

Referring to FIG. 11C, the dielectric layer 322 and the passivation layer 312 are defined to form a second opening 1110 that serves as a contact window, and to expose the second storage capacitor metal layer 1106 that is above the first opening 1103.

Figure 11D:
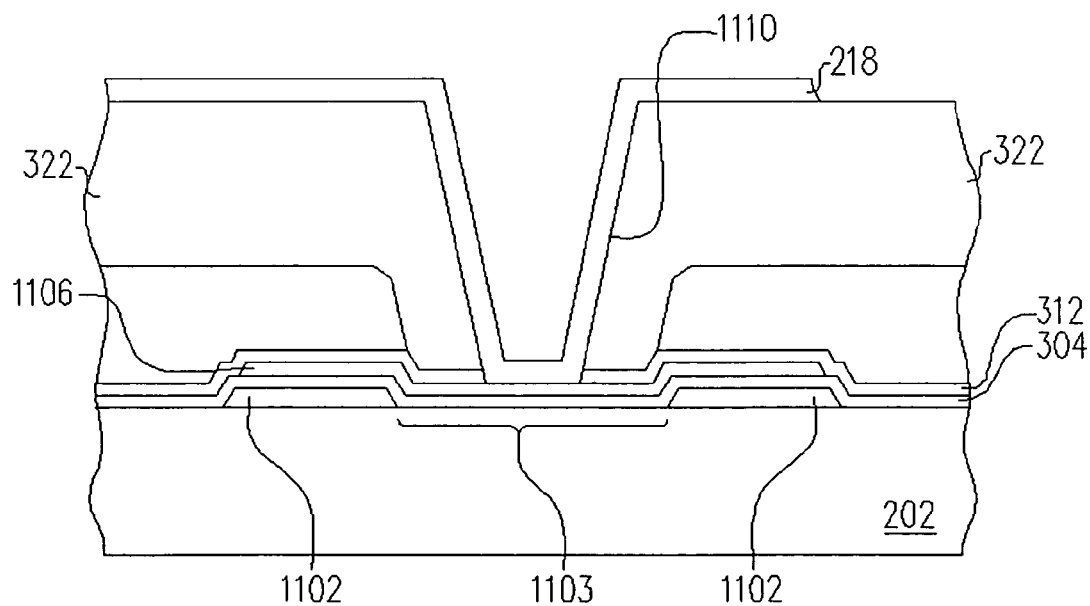

Referring to FIG. 11D, a pixel electrode 218 is formed above the dielectric layer 322, and is electrically connected to the second storage capacitor metal layer 1106 through the second opening 1110. After the pixel electrode 218 is formed, a welding process can proceed to weld the pixel electrode 218 (which is at the second opening 1110) with the second storage capacitor metal layer 1106. The first storage capacitor metal layer 1102 is positioned away from the second opening 1110 that serves as a contact window. When the pixel electrode 218 is welded to the second storage capacitor metal layer 1102 in order to fix poor electrical contacts, the short-circuiting of the first and second storage capacitor metal layers 1102 and 1106 can be avoided.

Figure 12:
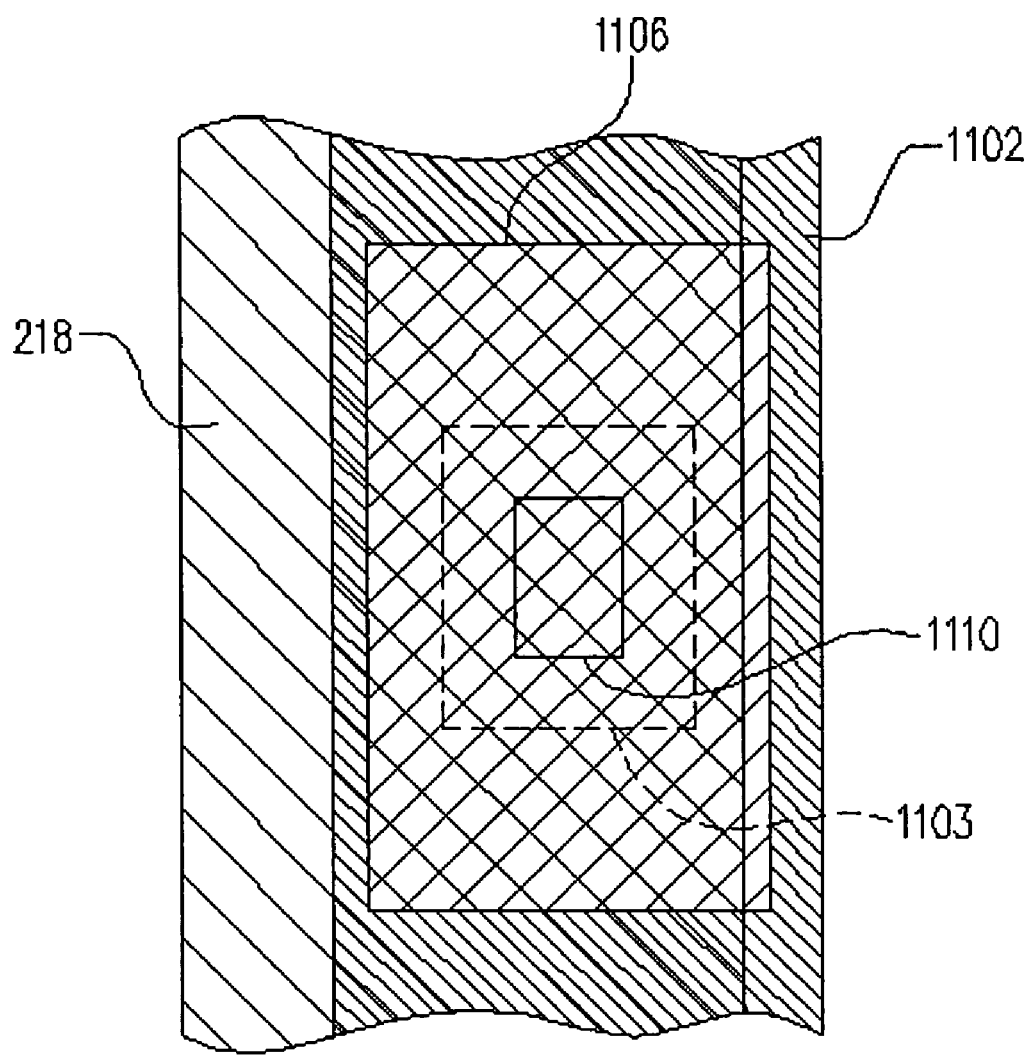
FIG. 12 shows a top view of the storage capacitor of the TFT array substrate according to the fifth embodiment of the invention.

FIGS. 11D and 12 show the structure of the fifth embodiment, in which FIG. 12 is a top view of a storage capacitor of the TFT array substrate according to the fifth embodiment of the present invention.

Referring to FIGS. 11D and 12, the fifth embodiment uses a welding point (which is the opening 1110) similar to the welding point of the repair structure of the fourth embodiment, a welding process can be used to weld the pixel electrode 218 and the second storage capacitor metal layer 1106 to prevent poor electrical contact at their interface and to improve the storage capacitor's storage capability. Because the first storage capacitor metal layer 1102 is positioned away from the contact window formed by the opening 1110, during the welding process, the problem of short-circuiting the first and second storage capacitor metal layers can be avoided.

The present invention includes the following features:

1. The TFT array substrate according to the present invention uses overlapping color filters to replace the black matrix, the yield rate of the TFT LCD panel can be improved due to reduced errors in the alignment of the TFT array substrate and the opposite substrate.

2. The TFT array substrate can have, color filter stacks and metal layers that contact or partially overlap each other, at the borders of the display area to achieve a good light shielding effect.

3. Partially connected or partially overlapping metal layers are used at the liquid crystal injection hole at the border of the display area of the TFT array substrate. Color filter blocks can also be used to effectively shield light and to increase the size of the liquid crystal injection hole.

4. The welding point of the repair structure of the TFT array substrate is only covered by a single passivation layer, thus dielectric layer bursts (which may occur in a prior art structure that has a dielectric layer above the welding point) can be prevented during the repair process.

5. The TFT array substrate, which has integrated color filters, has storage capacitors having welding points similar to those used for repair structures. This can prevent poor electrical contact between the metal layer and the pixel electrode, and increase the effectiveness of the storage capacity. Because the first metal layer is positioned away from the opening used as the contact window, short-circuiting of the first and second metal layers during a welding process can be prevented.

In the present invention, by using the color filter stacks to replace the black matrix, the fabrication time and cost can be greatly reduced. Responsive to special requirements of different parts of the LCD panel, this invention provides improvements in the structure and the fabrication process of the LCD panel to save time and effort.

Although the present invention has been described using the embodiments above, the invention should not be limited to those embodiments, and can be modified by a person skilled in the art in various manners without departing from the spirit and scope of the invention. The scope of the present invention should only be limited by the claims below.

I claim:

1. A thin film transistor (TFT) array substrate, comprising:
a display area;
a non-display area that is adjacent to the display area;
first metal layers that are disposed at the non-display area;
second metal layers that are disposed adjacent to the first metal layers to prevent light leakage at the non-display area; and
an insulating layer between the first metal layers and the second metal layers.

2. The TFT array substrate of claim 1, further comprising: scan lines disposed in the display area.

3. The TFT array substrate of claim 1, wherein the second metal layers overlap a portion of the first metal layers.

4. The TFT array substrate of claim 2, further comprising data lines disposed in the display area, the data lines and the scan lines defining pixel regions.

5. A thin film transistor (TFT) array substrate, comprising:
a display area;
a non-display area that is adjacent to the display area;
a first metal layer that is disposed at the non-display area;
a second metal layer that is disposed at a position that is at least adjacent to the first metal layer;
an insulating layer between the first metal layer and the second metal layer; and
at least one ring-shaped color filter that surrounds the display area.

6. The TFT array substrate of claim 5, further comprising: scan lines disposed in the display area.

7. The TFT array substrate of claim 5, wherein the at least one ring-shaped color filter includes two color filters that overlap each other.

8. The TFT array substrate of claim 5, wherein the second metal layer overlaps a portion of the first metal layer.

9. The TFT array substrate of claim 8, further comprising data lines disposed in the display area, the data lines and the scan lines defining pixel regions.

10. The TFT array substrate of claim 9, further comprising thin film transistors disposed at the intersections of the data lines and the scan lines and controlled by using the data lines and the scan lines.

11. The TFT array substrate of claim 10, further comprising pixel electrodes disposed in the pixel regions and electrically connected to corresponding thin film transistors.

12. The TFT array substrate of claim 9, further comprising color filters disposed above the pixel regions.

13. The TFT array substrate of claim 12, wherein the color filters extend to the non-display area.

14. The TFT array substrate of claim 13, wherein the at least one ring-shaped color filter and the color filters disposed above the pixel regions have at least one common color filter.

15. The TFT array substrate of claim 12, further comprising an insulation layer disposed between the color filters and the second metal layer.

16. A light shielding structure for use in a non-display area of a thin film transistor (TFT) array substrate, comprising:
 a first metal layer disposed at the non-display area;
 a second metal layer that is adjacent to the first metal layer, the first and the second metal layers being electrically insulated from each other by an insulation layer;
 at least one color filter disposed above the first and the second metal layers; and
 an insulation layer disposed between the color filter and the second metal layer.

17. The light shielding structure of claim 16, wherein the first metal layer has a portion that overlaps a portion of the second metal layer to prevent light leakage due to incident light that is inclined at an angle.

18. The light shielding structure of claim 16, wherein the first metal layer is electrically floated.

19. The light shielding structure of claim 16, wherein the second metal layer is electrically floated.

20. The light shielding structure of claim 16, wherein the first metal layer is electrically connected to a scan line of the TFT array substrate.

21. The light shielding structure of claim 16, wherein the second metal layer is electrically connected to a data line of the TFT array substrate.

22. The light shielding structure of claim 16, further comprising a color filter stack positioned above the color filter.

23. The light shielding structure of claim 16, wherein the second metal layer partially overlaps a portion of the first metal layer.

24. A thin film transistor (TFT) array substrate that includes a display area and a non-display area, the non-display area having a liquid crystal injection hole, characterized in that
 first metal layers are disposed in the non-display area;
 second metal layers are at least adjacent to the first metal layers;
 a color filter stack is disposed at the non-display area that is outside of the liquid crystal injection hole; and
 a first color filter block is positioned above the portion of the non-display area exposed by the liquid crystal injection hole.

25. The TFT array substrate of claim 24, wherein the second metal layers overlap portions of the first metal layers.

26. The TFT array substrate of claim 24, further comprising:
 scan lines disposed in the display area;
 data lines disposed in the display area, the scan lines and the data lines defining pixel regions;
 thin film transistors disposed at the intersections of the data lines and the scan lines and controlled by using the data lines and the scan lines;
 pixel electrodes disposed in the pixel regions and electrically connected to corresponding thin film transistors; and
 color filters disposed above the pixel regions.

27. The TFT array substrate of claim 26, further comprising a second color filter block that is disposed above the area at the border of the display area that is exposed by the liquid crystal injection hole, the second color filter block being adjacent to the first color filter block.

28. The TFT array substrate of claim 27, further comprising a third color filter block that is disposed above the area at the border of the display area that is exposed by the liquid crystal injection hole, the third color filter block being adjacent to the second color filter block.

29. The TFT array substrate of claim 26, wherein the color filters extend to the border of the display area.

30. The TFT array substrate of claim 29, wherein the color filters include a first color filter.

31. The TFT array substrate of claim 30, wherein the color filter stack includes a second color filter and a third color filter that overlap each other.

32. The TFT array substrate of claim 30, wherein the color filter stack includes one of a second color filter and a third color filter.

33. A thin film transistor (TFT) array substrate that includes a display area and a non-display area, the non-display area having a liquid crystal injection hole, characterized in that
 first metal layers are disposed at the portion of the substrate at the border of the display area exposed by the liquid crystal injection hole;
 second metal layers are disposed at positions so that the second metal layers are at least adjacent to the first metal layers to prevent light leakage from the liquid crystal injection hole at the border of the display area; and
 an insulating layer between the first metal layers and the second metal layers.

34. The TFT array substrate of claim 33, wherein the second metal layers overlap portions of the first metal layers.

35. The TFT array substrate of claim 33, further comprising:
 scan lines disposed on the substrate in the display area.

36. The TFT array substrate of claim 35, further comprising data lines disposed on the substrate in the display area, the scan lines and the data lines defining pixel regions.

37. The TFT array substrate of claim 36, further comprising thin film transistors disposed at the intersections of the data lines and the scan lines and controlled by using the data lines and the scan lines.

38. The TFT array substrate of claim 37, further comprising pixel electrodes disposed in the pixel regions and electrically connected to corresponding thin film transistors.

39. The TFT array substrate of claim 38, further comprising color filters disposed below the pixel electrodes.

40. The TFT array substrate of claim 39, wherein the color filters include red filters, green filters, and blue filters.

41. The TFT array substrate of claim 39, further comprising an insulation layer disposed between the color filters and the second metal layers.

42. A thin film transistor (TFT) array substrate having storage capacitors, the TFT array substrate comprising:
 a first metal layer disposed on a substrate, the first metal layer including scan lines, gate electrodes, and first storage capacitor metal layers, the first storage capacitor metal layers having first openings;
 an insulation layer covering the first metal layer;

channel layers disposed on the insulation layer above the gate electrodes;

a second metal layer disposed above the substrate, the second metal layer including source electrodes, drain electrodes, data lines, and second storage capacitor metal layers, wherein the source electrodes and the drain electrodes are disposed above the gate electrodes and at the two sides of the channel layers, the data lines and the scan lines define pixel regions, the second storage capacitor metal layers overlap the first storage capacitor metal layers, and together with the insulation layer form the storage capacitors, and the gate electrodes, source electrodes, the drain electrodes, and the channel layers form thin film transistors;

a dielectric layer disposed above the first metal layer, the insulation layer, and the second metal layer, wherein the dielectric layer has second openings and third openings, the second openings approximately exposing the second storage capacitor metal layers above the first openings, and the third openings exposing the source electrodes of the thin film transistors;

pixel electrodes disposed in the pixel regions, the pixel electrodes being electrically connected to the second storage capacitor layers through the second openings, the pixel electrodes being electrically connected to the source electrodes of corresponding thin film transistors through the third openings; and color filters disposed on the pixel regions outside of the second openings.

43. The TFT array substrate of claim 42, wherein the color filters comprises red filters, green filters, and blue filters.

44. The TFT array substrate of claim 42, wherein the first storage capacitor metal layers include the scan lines.

45. The TFT array substrate of claim 42, wherein the first storage capacitor metal layers include a common line.

46. The TFT array substrate of claim 4, further comprising thin film transistors disposed at the intersections of the data lines and the scan lines and controlled by using the data lines and the scan lines.

47. The TFT array substrate of claim 46, further comprising pixel electrodes disposed in the pixel regions and electrically connected to corresponding thin film transistors.

48. The TFT array substrate of claim 47, further comprising color filters disposed below the pixel electrodes.

49. The TFT array substrate of claim 48, wherein the color filters include red color filters, green color filters, and blue color filters.

50. The TFT array substrate of claim 48, further comprising an insulation layer disposed between the color filters and the second metal layers.

51. A thin film transistor (TFT) liquid crystal display (LCD) panel having storage capacitors, the TFT LCD panel comprising:

a TFT array substrate, comprising:
a first metal layer disposed on the TFT array substrate, the first metal layer including scan lines, gate electrodes, and first storage capacitor metal layers, the first storage capacitor metal layers having first openings;

an insulation layer covering the first metal layer;

channel layers disposed on the insulation layer above the gate electrodes;

a second metal layer disposed above the TFT array substrate, the second metal layer including source electrodes, drain electrodes, data lines, and second storage capacitor metal layers, wherein the source electrodes and the drain electrodes are disposed above the gate electrodes and at the two sides of the channel layers, the data lines and the scan lines define pixel regions, the second storage capacitor metal layers overlap the first storage capacitor metal layers, and together with the insulation layers form the storage capacitors, and the gate electrodes, the channel layers, the source electrodes, and the drain electrodes form thin film transistors;

a dielectric layer disposed above the first metal layer, the insulation layer, and the second metal layer, wherein the dielectric layer has second openings and third openings, the second openings approximately expose the second storage capacitor metal layers above the first openings, and the third openings expose the source electrodes of the thin film transistors;

pixel electrodes disposed in the pixel regions, the pixel electrodes being electrically connected to the second storage capacitor metal layers through the second openings, the pixel electrodes being electrically connected to the source electrodes of corresponding thin film transistors through the third openings; and color filters disposed above the pixel regions outside of the second openings;

an opposite substrate, spaced apart from the thin film transistor array substrate, the opposite substrate having a common electrode; and a liquid crystal layer disposed between the TFT array substrate and the opposite substrate.

52. The TFT LCD panel of claim 51, wherein the color filters comprise red filters, green filters, and blue filters.

53. The TFT LCD panel of claim 51, wherein the first storage capacitor metal layers include the scan lines.

54. The TFT LCD panel of claim 51, wherein the first storage capacitor metal layers include a common line.

55. The TFT LCD panel of claim 51, further comprising a photo spacer disposed between the TFT array substrate and the opposite substrate.

56. The TFT LCD panel of claim 51, further comprising an orientation layer disposed between the TFT array substrate and the liquid crystal layer.

57. The TFT LCD panel of claim 51, further comprising an orientation layer disposed between the opposite substrate and the liquid crystal layer.

* * * * *